(12) United States Patent
Berger

(10) Patent No.: US 10,696,009 B2
(45) Date of Patent: Jun. 30, 2020

(54) 3-D HONEYCOMB FOAM STRUCTURE

(71) Applicant: Nama Development LLC, Goleta, CA (US)

(72) Inventor: Jonathan Berger, Goleta, CA (US)

(73) Assignee: Nama Development LLC, Goleta, CA (US)

( * ) Notice: Subject to any disclaimer, the term of this patent is extended or adjusted under 35 U.S.C. 154(b) by 351 days.

(21) Appl. No.: 15/110,402

(22) PCT Filed: Jan. 7, 2015

(86) PCT No.: PCT/US2015/010458
§ 371 (c)(1),
(2) Date: Jul. 7, 2016

(87) PCT Pub. No.: WO2015/105859
PCT Pub. Date: Jul. 16, 2015

(65) Prior Publication Data
US 2016/0325520 A1    Nov. 10, 2016

Related U.S. Application Data

(60) Provisional application No. 61/924,681, filed on Jan. 7, 2014.

(51) Int. Cl.
*B32B 3/12* (2006.01)
*B32B 5/18* (2006.01)
(Continued)

(52) U.S. Cl.
CPC .............. *B32B 3/12* (2013.01); *B29C 69/001* (2013.01); *B32B 5/18* (2013.01); *B32B 5/24* (2013.01);
(Continued)

(58) Field of Classification Search
None
See application file for complete search history.

(56) References Cited

U.S. PATENT DOCUMENTS 2,682,235 A    6/1954 Fuller
2,986,241 A    5/1961 Fuller
(Continued)

OTHER PUBLICATIONS

Hakan Hisarligil, The Geometry of Cuboctahedra in Medieval Art in Anatolia, Nexus Network Journal Architecture and Mathematics, Dec. 29, 2017 (Year: 2017).*
(Continued)

*Primary Examiner* — David Sample
*Assistant Examiner* — Mary I Omori
(74) *Attorney, Agent, or Firm* — Jonathan M. D'Silva; MMI Intellectual Property

(57) ABSTRACT

What is presented is a unit cell that has a cellular geometry that comprises cell walls and cell edges arranged into a combination of a cubic cell geometry and a tetrahedral cell geometry and assembled structures that comprise a plurality of unit cells. The voids of the unit cell created by the combination of geometries comprise regular tetrahedrons, irregular tetrahedrons, and octahedrons. In some embodiments, the thickness of selected cell walls can vary and in some embodiments have zero thickness. In some embodiments selected cell walls and selected cell edges have a varied thickness. In other embodiments selected cell walls are non-planar. In some embodiments selected cell walls may have one or more holes. Selected cell edges of some embodiments of unit cell may have varying cross-sectional geometry that vary along a length of the cell edge. Some embodiments of the unit cell may comprise fillets to blunt stress concentrations.

11 Claims, 37 Drawing Sheets

(51) Int. Cl.
| | |
|---|---|
| B32B 9/00 | (2006.01) |
| F16F 7/12 | (2006.01) |
| B32B 9/04 | (2006.01) |
| B32B 15/04 | (2006.01) |
| B32B 5/24 | (2006.01) |
| E04C 2/36 | (2006.01) |
| B32B 27/06 | (2006.01) |
| E04C 3/28 | (2006.01) |
| F16S 3/08 | (2006.01) |
| E04B 1/19 | (2006.01) |
| B33Y 10/00 | (2015.01) |
| B33Y 70/00 | (2020.01) |
| B33Y 80/00 | (2015.01) |
| B29C 69/00 | (2006.01) |
| B32B 15/01 | (2006.01) |
| B32B 25/04 | (2006.01) |
| B32B 25/14 | (2006.01) |
| E04B 1/28 | (2006.01) |
| E04B 1/30 | (2006.01) |
| E04C 3/29 | (2006.01) |
| E04C 3/36 | (2006.01) |
| B29L 31/10 | (2006.01) |
| B29L 31/60 | (2006.01) |

(52) U.S. Cl.
CPC ............... *B32B 9/005* (2013.01); *B32B 9/04* (2013.01); *B32B 9/041* (2013.01); *B32B 15/01* (2013.01); *B32B 15/04* (2013.01); *B32B 25/042* (2013.01); *B32B 25/14* (2013.01); *B32B 27/06* (2013.01); *B33Y 10/00* (2014.12); *B33Y 70/00* (2014.12); *B33Y 80/00* (2014.12); *E04B 1/19* (2013.01); *E04B 1/28* (2013.01); *E04B 1/30* (2013.01); *E04C 2/365* (2013.01); *E04C 3/28* (2013.01); *F16F 7/121* (2013.01); *F16S 3/08* (2013.01); *B29K 2995/0046* (2013.01); *B29K 2995/0078* (2013.01); *B29K 2995/0091* (2013.01); *B29L 2031/10* (2013.01); *B29L 2031/608* (2013.01); *B32B 2250/40* (2013.01); *B32B 2307/51* (2013.01); *B32B 2307/542* (2013.01); *B32B 2307/56* (2013.01); *B32B 2419/00* (2013.01); *E04C 3/29* (2013.01); *E04C 3/36* (2013.01)

(56) References Cited

U.S. PATENT DOCUMENTS

| | | | |
|---|---|---|---|
| 3,220,152 A | | 11/1965 | Sturm |
| 5,448,868 A | * | 9/1995 | Lalvani .............. A63B 9/00 52/648.1 |
| 2002/0058456 A1 | * | 5/2002 | Miller .............. A63H 33/084 446/85 |
| 2014/0272277 A1 | | 9/2014 | Schaedler et al. |

OTHER PUBLICATIONS

Hisarligil et al., Back to the Future: 'Cuboctahedron' Revisited, 2009, Design Principles and Practices: An International Journal vol. 3, pp. 109-124 (Year: 2009).*

* cited by examiner

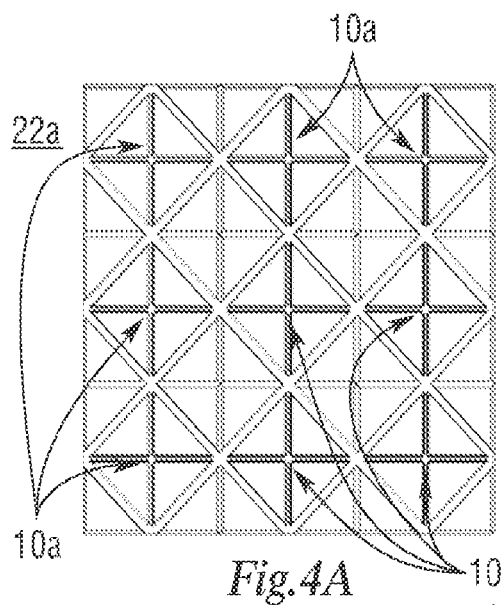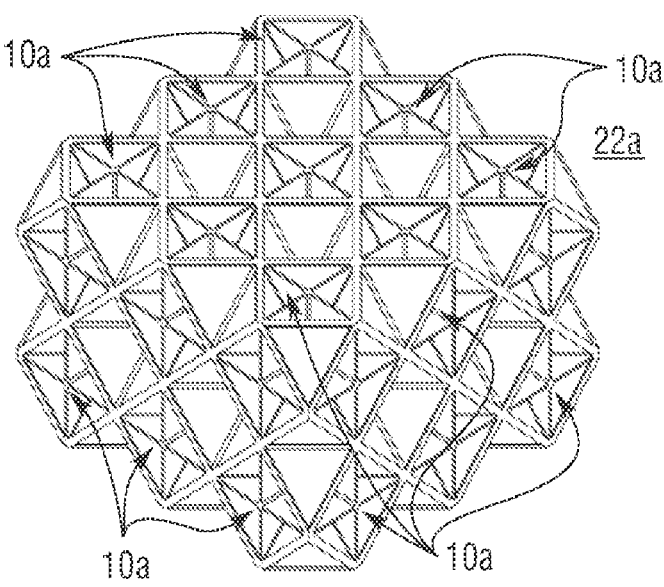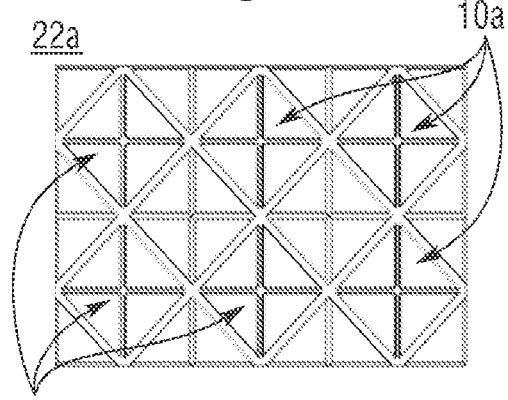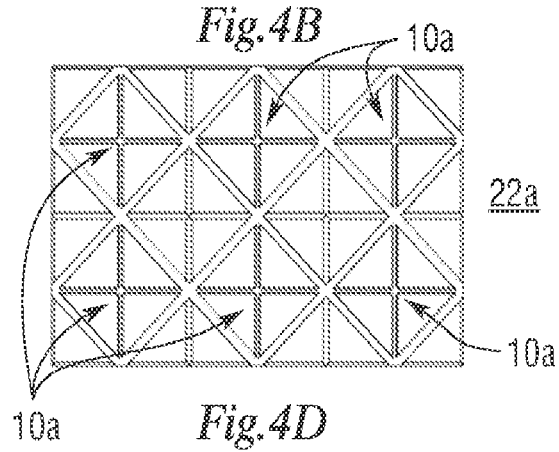

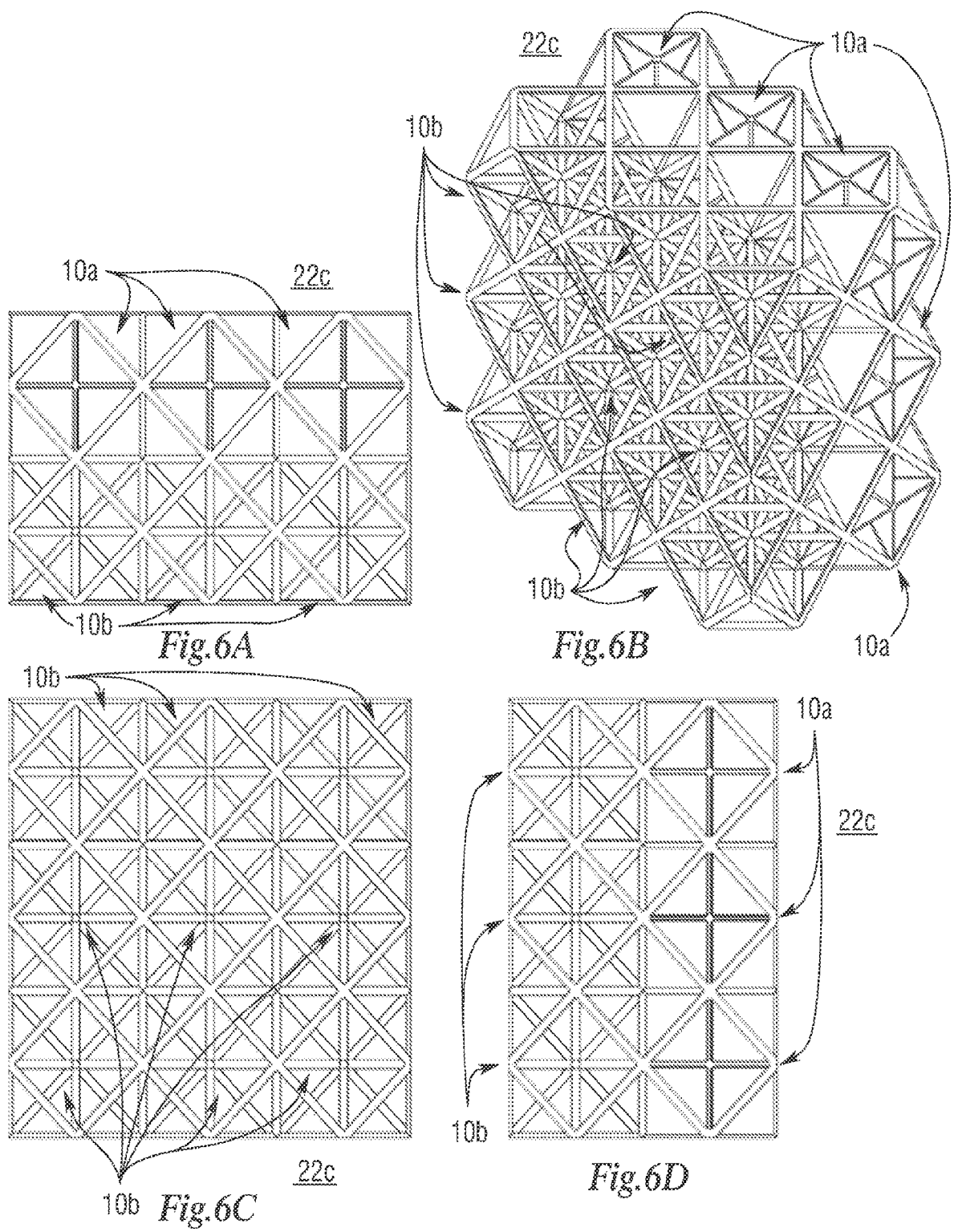

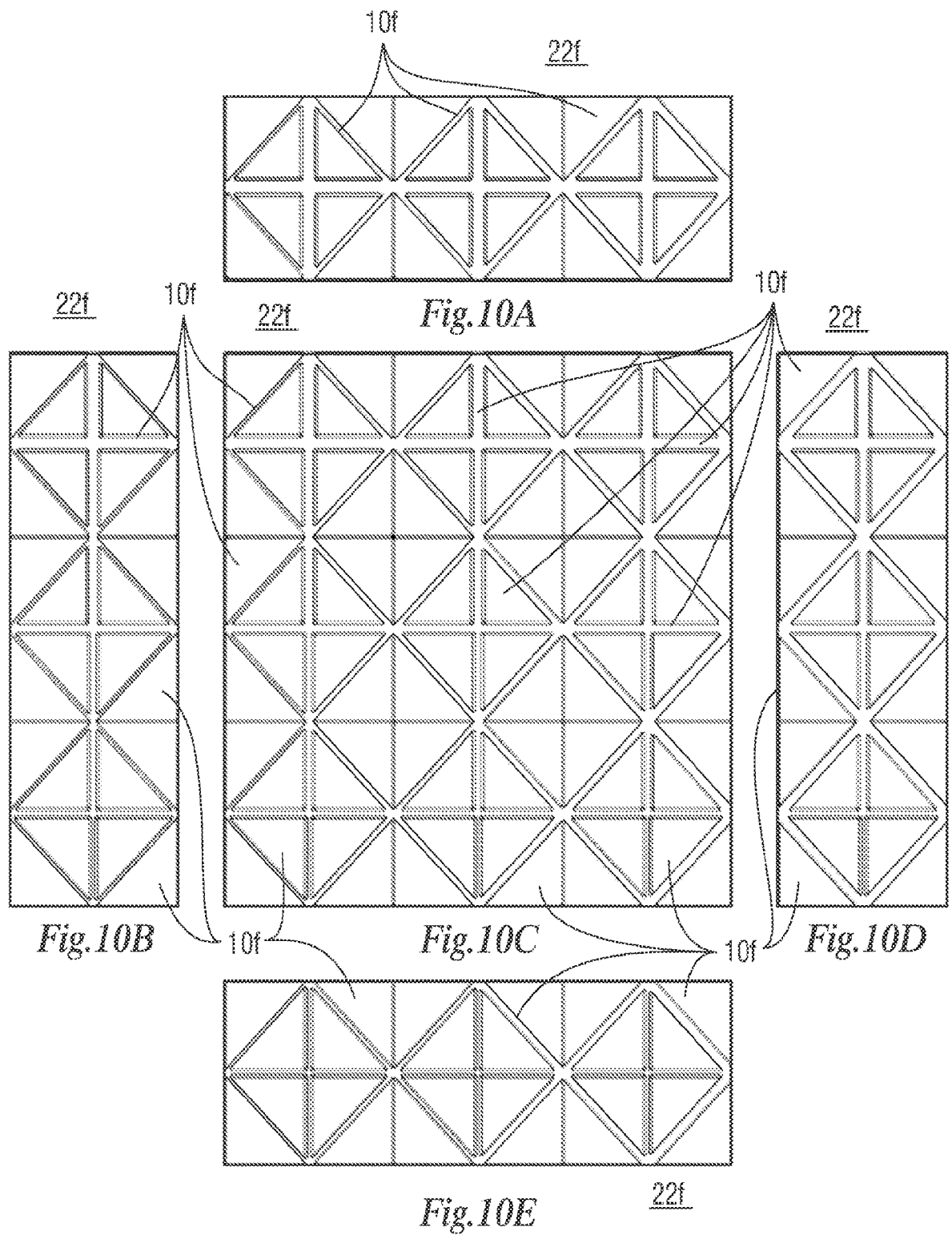

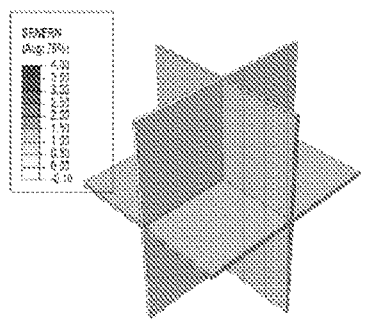
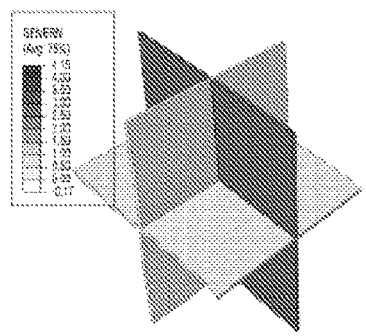
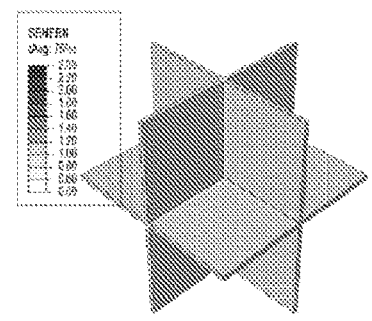
Fig.19A      Fig.19B      Fig.19C
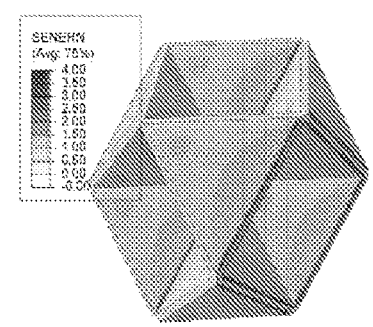
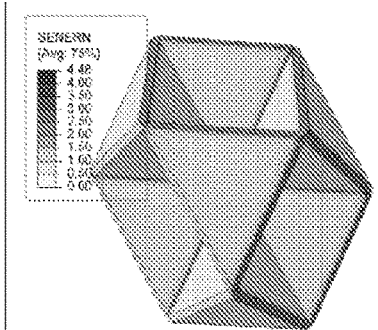
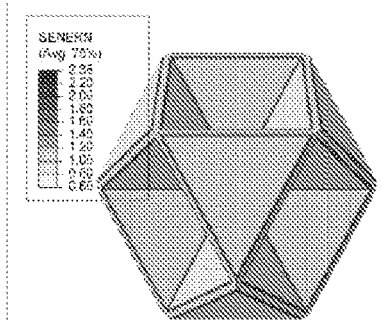
Fig.20A      Fig.20B      Fig.20C
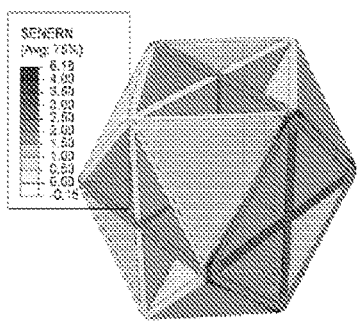
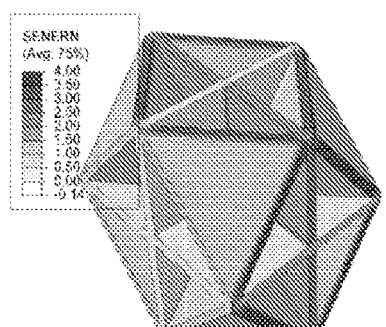
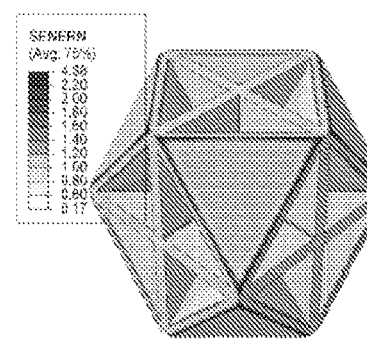
Fig.21A      Fig.21B      Fig.21C
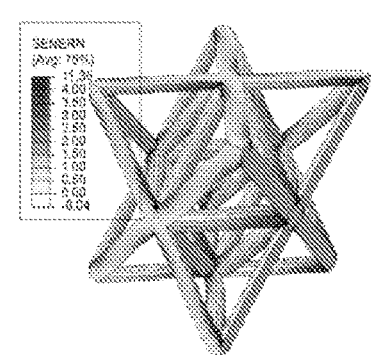
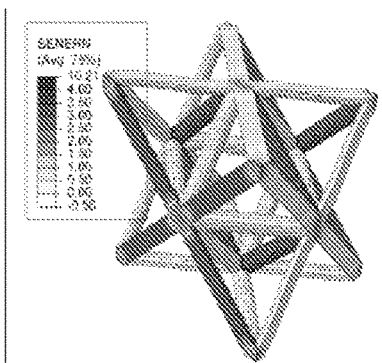
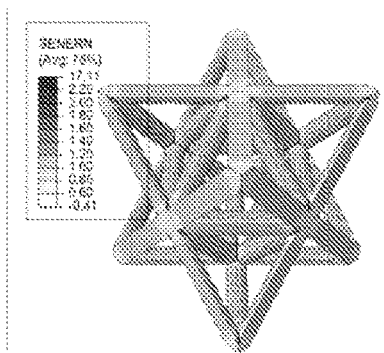
Fig.22A      Fig.22B      Fig.22C

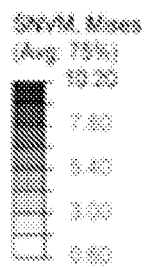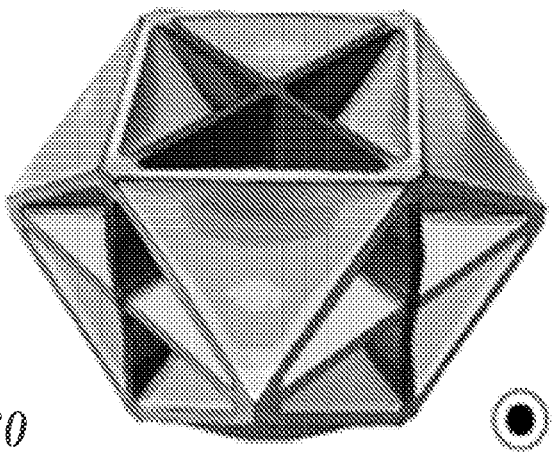
Fig.30
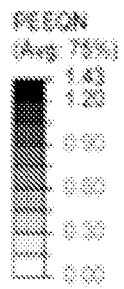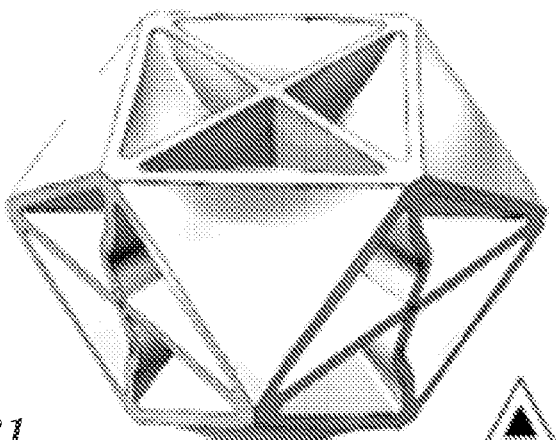
Fig.31
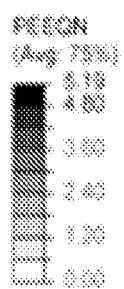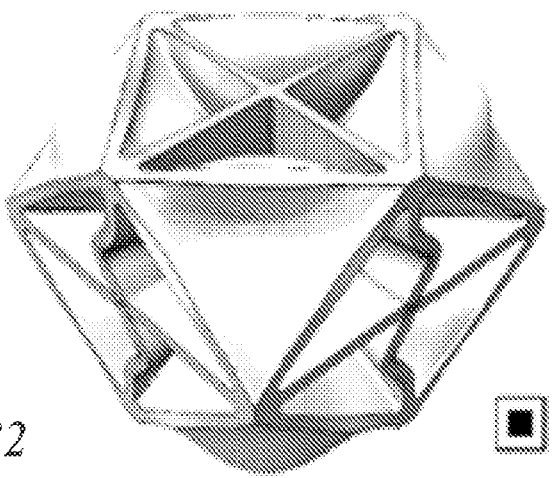
Fig.32

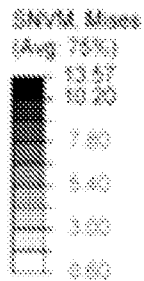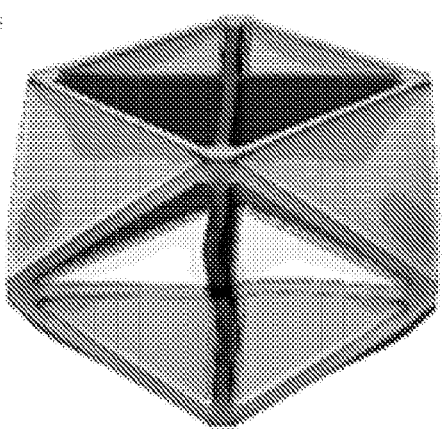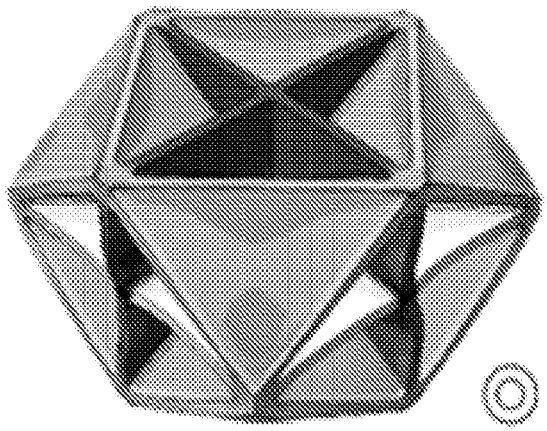
*Fig.33*
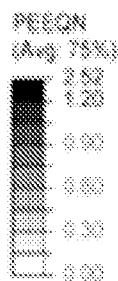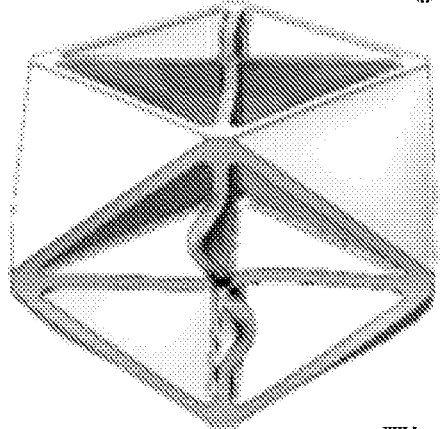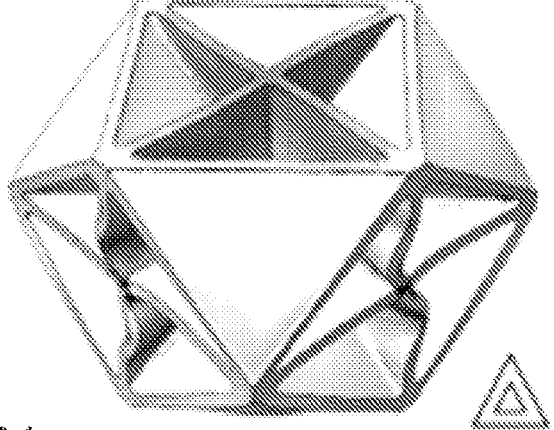
*Fig.34*
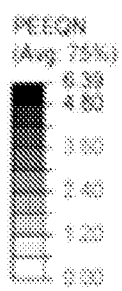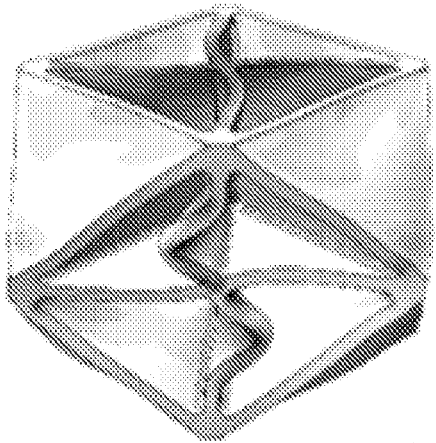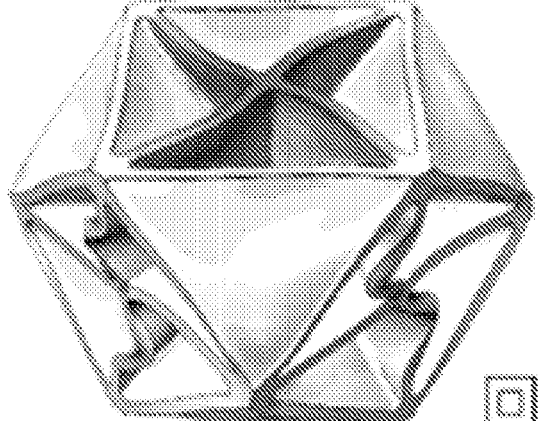
*Fig.35*

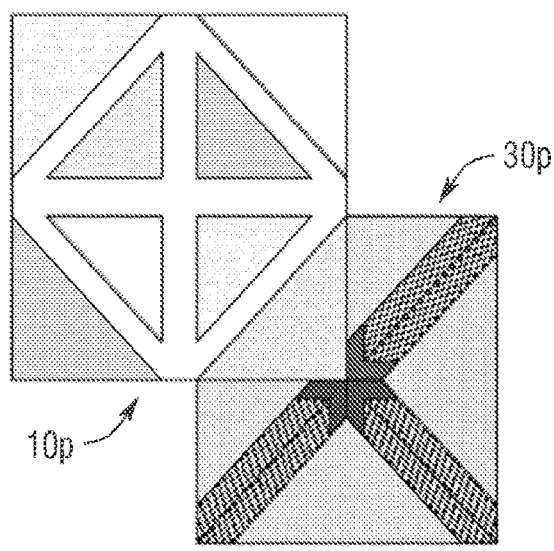
Top  Fig.39
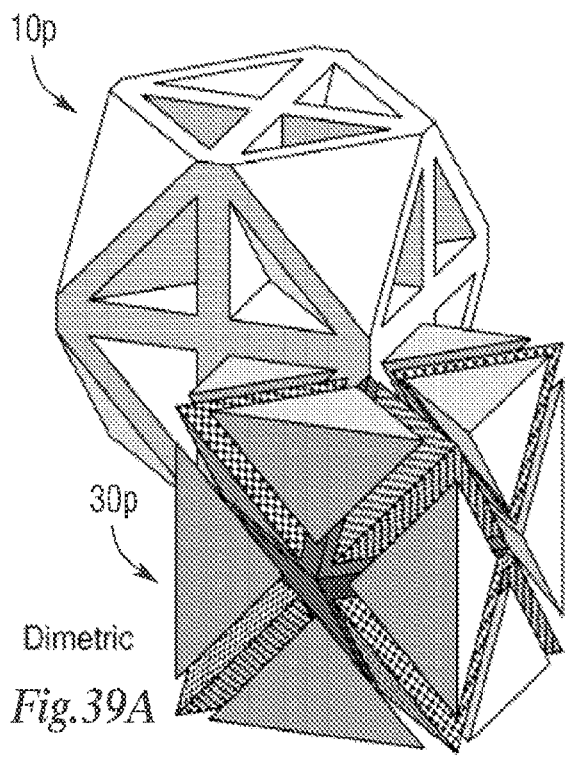
Dimetric  Fig.39A
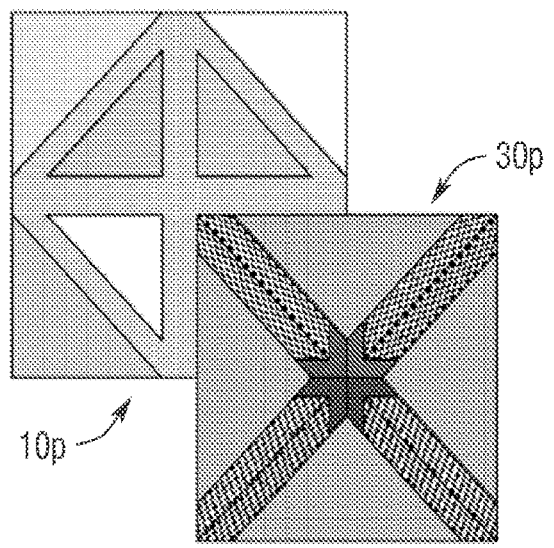
Front  Fig.39B
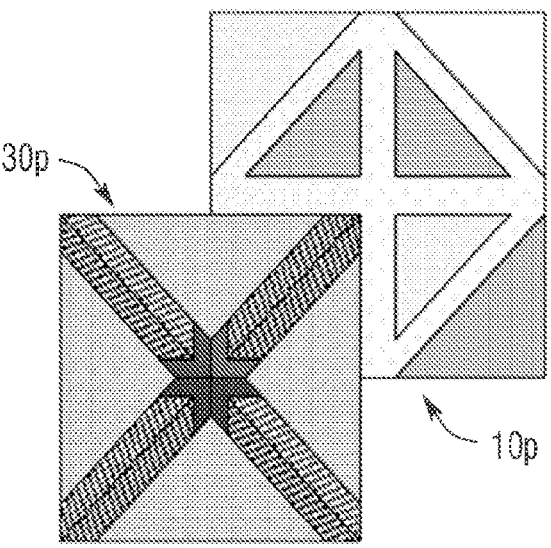
Right  Fig.39C Top Dimetric Front Right

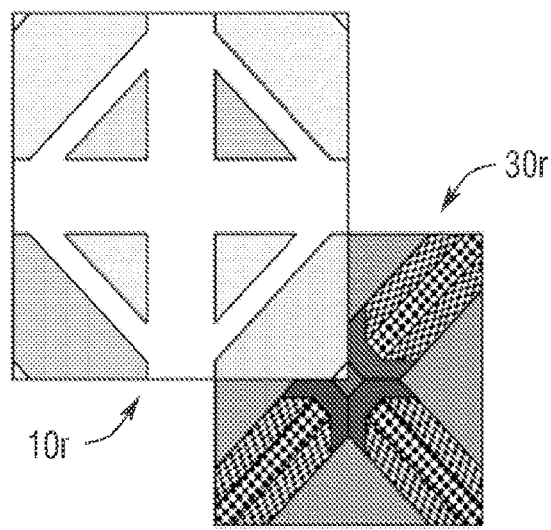
Top    *Fig.41*
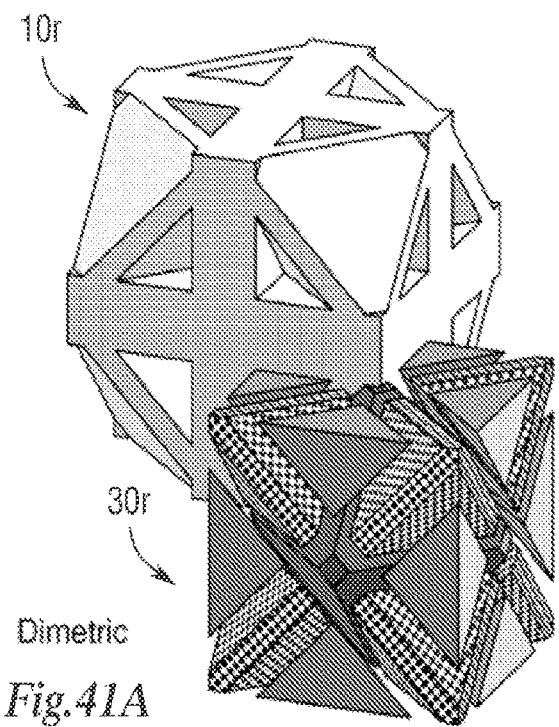
Dimetric
*Fig.41A*
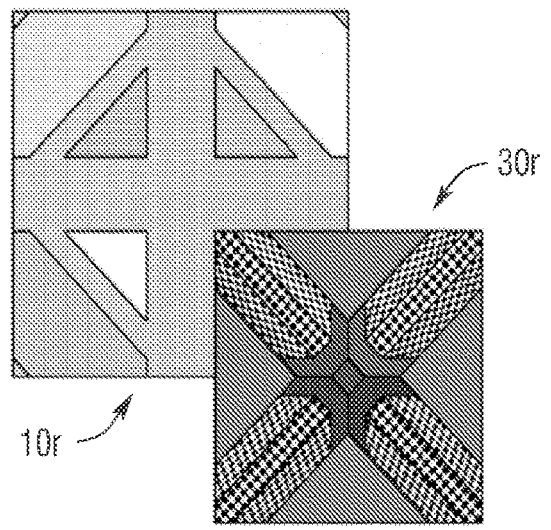
Front    *Fig.41B*
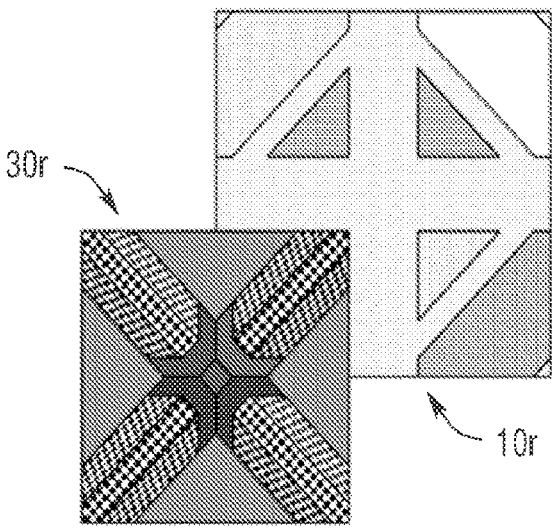
Right    *Fig.41C*

3-D HONEYCOMB FOAM STRUCTURE

This application takes priority from U.S. Provisional Patent Application No. 61/924,681 filed on Jan. 7, 2014 which is incorporated herein by reference.

BACKGROUND

Light weight structural materials in the form of lattices and foams are attractive to engineers due to their efficient use of constituent materials. Foams and lattices can have high stiffnesses, strengths, and energy absorption capabilities relative to the amount of solid material in the system. These materials are generally known as cellular materials. They find particular utility as the core materials for hybrid structures as cushioning, thermal insulation, and in energy absorbing structures, such as helmets and packaging used in shipping. Their properties are derived largely from the geometric arrangement of the constituent materials. Most commonly this arrangement is on a length scale that is small compared to the part or device to which they are attached and large compared to the microstructure of the constituent material.

Cellular materials are ubiquitous in engineered systems due to the wide range of properties they exhibit. They can be formed from a wide variety of materials including stiff and flexible polymers, ductile metals, and ceramics. The intrinsic properties of the constituent material, such as thermal and electrical conductivity, are inherited, although modified by the geometry of the cell. Cellular geometries exist in a space ranging from open to closed cell and random to ordered. Lattices are open cell ordered structures, for example. The stiffness and strength of cellular materials vary with their position in this space as various arrangements of beam and plate members. Closed cell stochastic (random) foams are known to have a higher specific stiffness (stiffness per unit mass of constituent material) than open cell random foams. This is in part due to the constraint that cell faces place on the deformation of cell edges, greatly limiting the available modes of deformation, in are what otherwise bending dominated structures. Lattices are known to outperform closed cell random foams, also because there is less bending of material. Stress and strain energy is relatively well distributed in aligned members leading to higher performance. Closed cell ordered foams have the highest potential performance, due to the alignment and constraint of material. Cell edges are aligned similarly to lattices and have the added support of cell faces, which are also aligned. These closed cell ordered materials have the unique ability, due to contribution from multiple factors, to achieve theoretical upper bounds for stiffness Ordered foams, in the form of honeycombs, are widely used in engineered systems but possess inherent anisotropy due to their two-dimensional (2-D) geometry. Complex three-dimensionally (3-D) aligned materials can now be practically developed with the advent of 3-D printing and other modern automated assembly techniques, referred to generally as direct manufacturing, additive manufacturing, or rapid prototyping. These techniques can be used to fabricate closed cell highly aligned materials of virtually any geometry, including isotropic designs. Isotopic, or non-directional, material properties are advantageous in many applications where loads are multi-axial (multi-directional), or simply to avoid the complexity of designing with aniso-tropic materials. Direct manufacturing allows for the production of complex cellular materials.

Direct manufacturing removes much of the cost associated with fabricating complex designs. In traditional machining techniques and bonding methods, such as brazing and welding, the level of complexity builds as the part is manufactured. Parts begin as a simple billet block or with pairs of members to be bonded. Features are then added, with tool passes to remove material or bonded by welding, adhesives, brazing or other methods to join material. Each tool pass and weld has an associated cost that increases with the complexity of the part. With direct manufacturing the complexity is inherent, with no additional associated cost. Fabricating large monolithic parts, like the geometry of a billet block, requires the most time and cost in these types of techniques, low density efficient materials the least. Historically, honeycombs and lattice have been limited to high end applications such as aviation and space due to their high cost. With this cost mitigated by direct manufacturing such ordered materials can now find much wider use to the benefit of both producers and users of manufactured goods. The question then becomes that of identifying material geometries that utilize the printed constituent materials in the most efficient way.

What is presented are material cellular geometries that achieve a very large portion of theoretical upper bounds for stiffness and that can be used to create cell structures that can further take advantage of the benefits provided by direct manufacturing methods.

SUMMARY

What is presented is a unit cell that has a cellular geometry that comprises cell walls and cell edges arranged into a combination of a cubic cell geometry and a tetrahedral cell geometry. The voids of the unit cell created by the combination of geometries comprise regular tetrahedrons, irregular tetrahedrons, and octahedrons. In some embodiments, the thickness of selected cell walls can vary and in some embodiments have zero thickness. In some embodiments selected cell walls and selected cell edges have a varied thickness. In other embodiments selected cell walls are non-planar. In some embodiments selected cell walls may have one or more holes. Selected cell edges of some embodiments of unit cell may have varying cross-sectional geometry that in some embodiments vary along a length of the cell edge. Some embodiments of the unit cell may comprise fillets to blunt stress concentrations.

The unit cells in some embodiments may have a device connected to the unit cell or even a device embedded within the unit cell. Embodiments of unit cells may be manufactured through a system that removes material, by welding, adhesives, brazing, or other joining methods, by using investment casting, or by a 3-D printing direct manufacturing method and may be made from metals, metal alloys, polymers, plastics, elastomers, ceramics, natural materials, composites, fiber, particulate reinforced composites, cermets, cellular materials, including lattices and open and closed cell foams, or any combination thereof.

The dimensions of the cell walls of some embodiments of the unit cell may have a ratio of $\sqrt{3}$ for the thickness of the cells walls of the cubic wall geometry to the thickness of the cell walls of said tetrahedral cell geometry. In some such embodiments, the geometry of the unit cell is determined by selecting one of the thickness of the cells walls of the cubic wall geometry, the thickness of the cell walls of the tetrahedral cell geometry, or the relative density of the unit cell.

Embodiments of assembled structures may be constructed that comprise a plurality of unit cells in which each unit cell has a cellular geometry that comprises cell walls and cell edges arranged into a cellular geometry that comprises a combination of a cubic cell geometry and a tetrahedral cell geometry. The unit cell in some embodiments of assembled structures of have voids created by the geometric combinations that comprise regular tetrahedrons, irregular tetrahedrons, and octahedrons. In some embodiments, the thickness of selected cell walls can vary and in some embodiments have zero thickness. In some embodiments selected cell walls and selected cell edges have a varied thickness. In other embodiments selected cell walls are non-planar. In some embodiments selected cell walls may have one or more holes. Selected cell edges of some embodiments of unit cell may have varying cross-sectional geometry that in some embodiments vary along a length of the cell edge. Some embodiments of the unit cell may comprise fillets to blunt stress concentrations. Embodiments of assembled structure could be formed into a variety of configurations such as a sandwich panel, a beam, a channel, or a tube.

Various embodiments of assembled structures may be manufactured through a system that removes material, by welding, adhesives, brazing, or other joining methods, by using investment casting, or by a 3-D printing direct manufacturing method. Various embodiments of the assembled structure may be made from metals, metal alloys, polymers, plastics, elastomers, ceramics, natural materials, composites, fiber, particulate reinforced composites, cermets, cellular materials, including lattices and open and closed cell foams, or any combination thereof.

The method of creating a unit cell is also disclosed wherein the unit cell has a cellular geometry that comprises cell walls and cell edges arranged into a combination of a cubic cell geometry and a tetrahedral cell geometry. Embodiments of unit cells are created from a planar pattern that can be cut and folded to form four tetrahedra of the tetrahedral cell geometry and three of the cell walls of the cubic cell geometry and applying the planar pattern to a selected material capable of being cut and folded. A first piece of the selected material is cut to match the planar pattern and then further cut and folded to form four tetrahedra of the tetrahedral cell geometry and three of the cell walls of the cubic cell geometry. The planar pattern is applied to the selected material for a second time and a second piece of the selected material is cut to match the planar pattern. The second piece is cut and folded to form four tetrahedra of the tetrahedral cell geometry and three of the cell walls of the cubic cell geometry. The first piece and the second piece to form a complete unit cell. Unit cells created using this method may be created where the selected material is a metal, a metal alloy, a polymer, a plastic, an elastomer, a ceramics, a natural material, a composite, a fiber, a particulate reinforced composite, a cermets, a cellular material, including a lattice, an open cell foam, or a closed cell foam, or any combination thereof.

A method of creating an assembled structure comprising a plurality of unit cells, wherein each of the unit cells have a cellular geometry that comprises cell walls and cell edges arranged into a combination of a cubic cell geometry and a tetrahedral cell geometry. Embodiments of unit cells are created from a planar pattern that can be cut and folded to form four tetrahedra of the tetrahedral cell geometry and three of the cell walls of the cubic cell geometry. Individual unit cells are created by repeating the following steps to create the required plurality of unit cells: (1) applying the planar pattern to a selected material capable of being cut and folded; (2) cutting a first piece of the selected material to match the planar pattern; (3) cutting and folding the first piece to form four tetrahedra of the tetrahedral cell geometry and three of the cell walls of the cubic cell geometry; (4) applying the planar pattern to the selected material a second time; (5) cutting a second piece of the selected material to match the planar pattern; (6) cutting and folding the second piece to form four tetrahedra of the tetrahedral cell geometry and three of the cell walls of the cubic cell geometry; and (7) combining the first piece and the second piece to form a complete individual unit cell; and joining a plurality of unit cells to create the assembled structure. The selected material may be a metal, a metal alloy, a polymer, a plastic, an elastomer, a ceramics, a natural material, a composite, a fiber, a particulate reinforced composite, a cermets, a cellular material, including a lattice, an open cell foam, or a closed cell foam, or any combination thereof. The assembled structure may be of any configuration such as a sandwich panel, a beam, a channel, or a tube.

These and other aspects of the present invention will be more fully understood following a review of this specification and drawings.

BRIEF DESCRIPTION OF DRAWINGS

For a more complete understanding and appreciation of this invention, and its many advantages, reference will be made to the following detailed description taken in conjunction with the accompanying drawings.

FIG. 4A depicts a front view of the assembled structure of FIG. 4;

FIG. 4B depicts an isometric view of the assembled structure of FIG. 4;

FIG. 4C depicts a bottom view of the assembled structure of FIG. 4;

FIG. 4D depicts a right-side view of the assembled structure of FIG. 4;

FIG. 6A depicts a top view of the assembled structure of FIG. 6;

FIG. 6B depicts an isometric view of the assembled structure of FIG. 6;

FIG. 6C depicts a front view of the assembled structure of FIG. 6;

FIG. 6D depicts a right-side view of the assembled structure of FIG. 6;

FIG. 10A is a top view of the assembled structure of FIG. 10;

FIG. 10B is a left-side view of the assembled structure of FIG. 10;

FIG. 10C is a front view of the assembled structure of FIG. 10;

FIG. 10D is a right-side view of the assembled structure of FIG. 10;

FIG. 10E is a bottom view of the assembled structure of FIG. 10;

FIG. 19A depicts strain energy distribution in a cubic cell under axial macroscopic strain;

FIG. 19B depicts strain energy distribution in a cubic cell under shear macroscopic strain;

FIG. 19C depicts strain energy distribution in a cubic cell under hydrostatic macroscopic strain;

FIG. 20A depicts strain energy distribution in a tetrahedral cell under axial macroscopic strain;

FIG. 20B depicts strain energy distribution in a tetrahedral cell under shear macroscopic strain;

FIG. 20C depicts strain energy distribution in a tetrahedral cell under hydrostatic macroscopic strain;

FIG. 21A depicts strain energy distribution in a unit cell under axial macroscopic strain;

FIG. 21B depicts strain energy distribution in a unit cell under shear macroscopic strain;

FIG. 21C depicts strain energy distribution in a unit cell under hydrostatic macroscopic strain;

FIG. 22A depicts strain energy distribution in an octet-strut cell under axial macroscopic strain;

FIG. 22B depicts strain energy distribution in an octet-strut cell under shear macroscopic strain;

FIG. 22C depicts strain energy distribution in an octet-strut cell under hydrostatic macroscopic strain;

FIG. 30 depicts normalized stresses of one of the compressed 3-D printed unit cells from FIG. 29 plotted on deformed finite element models;

FIG. 31 depicts normalized plastic strain of one of the compressed 3-D printed unit cells from FIG. 29 plotted on deformed finite element models;

FIG. 32 depicts normalized plastic strain of one of the compressed 3-D printed unit cells from FIG. 29 plotted on deformed finite element models;

FIG. 33 depicts normalized stresses of one of the compressed 3-D printed unit cells from FIG. 29 plotted on deformed finite element models;

FIG. 34 depicts normalized plastic strain of one of the compressed 3-D printed unit cells from FIG. 29 plotted on deformed finite element models;

FIG. 35 depicts normalized plastic strain of one of the compressed 3-D printed unit cells from FIG. 29 plotted on deformed finite element models;

FIG. 39 is a top view of an embodiment of the unit cell along with its reciprocal cells;

FIG. 39A is a diametric view of the unit cell of FIG. 39 along with its reciprocal cells;

FIG. 39B is a front view of the unit cell of FIG. 39 along with its reciprocal cells;

FIG. 39C is a right-side view of the unit cell of FIG. 39 along with its reciprocal cells;

FIG. 41 is a top view of an embodiment of the unit cell along with its reciprocal cells;

FIG. 41A is a diametric view of the unit cell of FIG. 41 along with its reciprocal cells;

FIG. 41B is a front view of the unit cell of FIG. 41 along with its reciprocal cells; and FIG. 41C is a right-side view of the unit cell of FIG. 41 along with its reciprocal cells;

DETAILED DESCRIPTION

Figure 1:
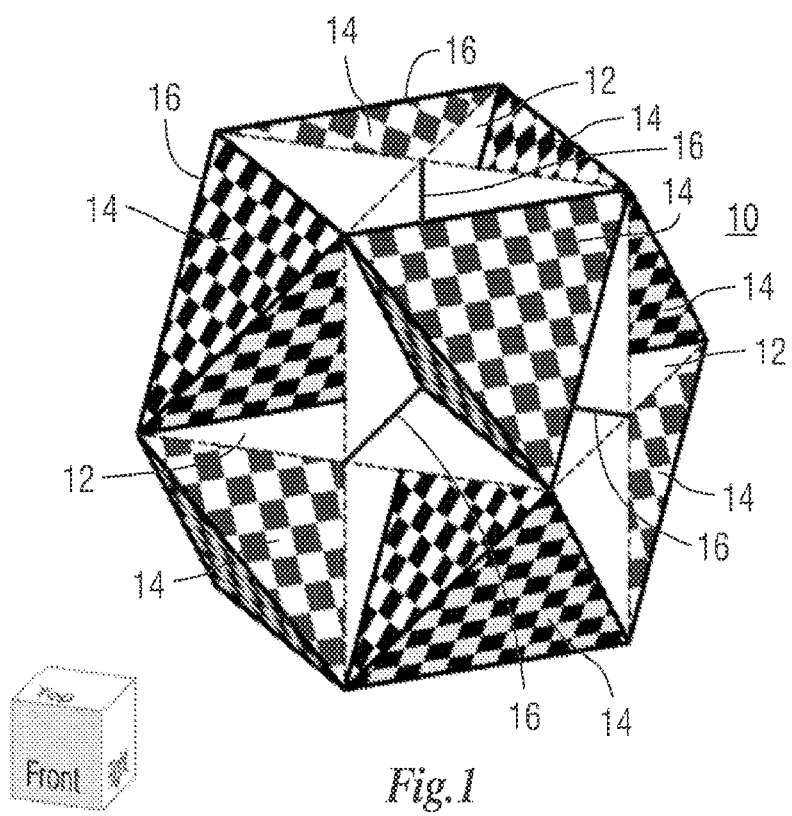
FIG. 1 depicts an embodiment of a unit cell.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

In identifying material geometries that utilize the printed constituent materials of direct manufacturing in the most efficient way, cellular geometries have been developed that achieve a very large portion of theoretical upper bounds for stiffness. The suite of theoretical bounds governs the stiffness of multiphase materials, in this case specified to a two-phase system. The theoretical bounds limit strain energy storage which is manifest in the stiffness of the material. Maximum stiffness therefore means maximum specific strain energy storage, which is also indicative of high strength.

The theoretical bounds are for isotropic or nearly isotropic materials. Isotropic materials have properties that are independent of direction. This is a macroscopic property of many homogeneous materials but not so of many cellular materials, whose properties are governed by their geometry. These cellular geometry is most commonly employed on the mesoscale resulting in effective macroscopic properties that result from the behavior of a large number of cells. The term 'macroscale' is used to refer to the scale of parts, such as a beam member in a frame. The term 'microscale' refers to the length scale of microstructural features. For example, dendrites in eutectic material systems. The mesoscale is then defined relatively, to be large compared to the microscale and small compared to the macroscale. In many, but not all, applications the size of the cells in the cellular network is small compared to the body it composes and/or the loads that body is subject to. The theoretically maximum nearly isotropic stiffness of this material make it an ideal engineering material for many applications.

The properties of these materials are calculated using finite element (FE) models. The homogenized (effective) properties of the cellular material geometries are calculated using periodic boundary conditions in what is known as a homogenization technique. The procedure is well established. Model results allow for the visualization of stress and strain energy distributions. Through these, insight is gained into the morphological features that give rise to high performance designs.

It is also necessary to quantify the performance of materials, which are often quite different in their morphology, in a way that allows for their direct comparison. Proper material characterization of existing designs is necessary to develop higher performing materials. To this end some quantities have been included herein that facilitate this characterization. It is with these modeling tools that necessary insight is gained to develop of the cellular geometries disclosed herein.

The assembled structures depicted herein are more accurately described as ordered foams, as they are cellular material with either open or closed unit cells that have a regular repeating geometry; this is in contrast to stochastic open and closed cell foams. Such ordered open cell foams are also referred to appropriately as lattices, while ordered foams and lattices are both considered hybrid materials. On the length scale of $\leq$ cm these materials can be fabricated using direct manufacturing methods, while on larger length scales, the hull of a large ship for example, bonding methods can be used to join sections as small as individual cell faces. The assembled structures can, however, be fabricated on the scales and out of the materials that technology allows. All such materials and scales are intended to be covered herein.

The maximum isotropic stiffness of the cellular geometries disclosed herein comes from a combination of two highly anisotropic substructures, identified through the modeling procedure. It is the summation, superposition, or interpenetration, of these two substructures which gives rise to the properties of the cellular geometries disclosed herein. The anisotropy of the cellular geometries disclosed herein can be tailored as a result, by independently varying the relative density of each substructure. The cellular geometries disclosed herein will be shown to have the capability of having maximum isotropic stiffness but also the capability of having varying degrees of anisotropy while retaining stiffness efficiency. The utility of such a flexible and efficient material is readily apparent.

In this FE modeling homogenization technique uniform strains, consistent with macroscopic loads, are applied to a cubic material volume where strains and stresses are localized as a function of the material geometry. In this analysis the effective Young's modulus, $\overline{E}$, of a material is then measured with the application of a uniaxial compressive stress applied normal to a face of the cubic volume element. The effective shear modulus, $\overline{G}$, is calculated from the application of a pure shear with shear strain boundary conditions (BC) applied to four of the six cubic volume elements. The effective bulk modulus, $\overline{K}$, is calculated from the application of a hydrostatic compressive strain. The bulk modulus is not, however, independent from the Young's modulus and the Poisson ratio, $\overline{v}$, calculated from the uniaxial stress case, in these cubically symmetric materials. Throughout, the bar notation is used to indicate the properties of the cellular material. The direct hydrostatic calculations are done to visualize the stress and strain energy distributions and to help verify results.

In a linear analysis the response of a unit cell is identical to that of an infinite array, with the material behaving as if embedded in an effective continuum. Calculating this representative response in this case is referred to as representative volume element (RVE) modeling. In the cases of non-linear analysis, such as buckling, more than one unit cell may be required to represent the systemic response. A unit cell is a basic geometric unit that possess the fundamental geometric features that describe a cellular geometry.

Modeling results are produced using the commercial finite element code Abaqus. This code allows for the generation of models, analysis, and visualization of results. The stiffness parameters are extracted from these models and then compiled in a manner amenable to comparison. The cellular geometries described herein are cubically symmetric and thus have three independent elastic constants. The cellular geometries can therefore be characterized by the elastic constants E, G, and K, the Young's, shear, and bulk modulus respectively. For the case of cellular materials these quantities are the effective quantities, $\overline{E}$, $\overline{G}$ and $\overline{K}$, respectively. To compare the performance of cellular materials to the bulk the effective quantities are normalized by the properties of the constituent material, $E_s$, $G_s$ and $K_s$ respectively. To compare the stiffness of different geometries the elastic constants are normalized by the relative density, $(\overline{\rho}/\rho_s)$, where $\overline{\rho}$ is the density of the cellular material and $\rho_s$ is the density of the constituent material, to their volume specific properties. The quantities of interest are then, $$\frac{\overline{E}/E_s}{\overline{\rho}/\rho_s}, \tag{1}$$

$$\frac{\overline{G}/G_s}{\overline{\rho}/\rho_s}, \tag{2}$$

$$\frac{\overline{K}/K_s}{\overline{\rho}/\rho_s}. \tag{3}$$

Each of these quantities is unity, $(\overline{E}/E_s)/(\overline{\rho}/\rho_s)=(\overline{G}/G_s)/(\overline{\rho}/\rho_s)=(\overline{K}/K_s)/(\overline{\rho}/\rho_s)=1$, for the fully dense isotropic constituent material. For any material geometry the properties are a function of relative density, $\overline{E}=\overline{E}(\overline{\rho}/\rho_s)=E_sf_1(\overline{\rho}/\rho_s)$, $\overline{G}=\overline{G}(\overline{\rho}/\rho_s)=G_sf_2(\overline{\rho}/\rho_s)$ and $\overline{K}=\overline{K}(\overline{\rho}/\rho_s)=K_sf_3(\overline{\rho}/\rho_s)$, where the $f_i$ are monotonic increasing functions of relative density. If the Young's and shear moduli vary independently with relative density, $f_1(\overline{\rho}/\rho_s) \neq f_2(\overline{\rho}/\rho_s)$, and the isotropy of the material is also a function of relative density. A measure of anisotropy is then the ratio, $$\frac{\overline{E}/E_s}{\overline{G}/G_s}. \tag{4}$$

Which is unity for a material whose Young's and shear modulus vary similarly with relative density. A derived term is, $$a^*=1-|1-(\overline{E}/E_S)/(\overline{G}/G_S)|, \tag{5}$$

where $a^* \leq 1$ for all materials. This is used as a penalizing term later to calculate the isotropic stiffness of materials. A well-known measure of anisotropy for cubically symmetric materials is the Zener anisotropy ratio, $$a = \frac{\overline{C}_{11} - \overline{C}_{12}}{2\overline{C}_{44}} \approx \frac{\overline{E}/E_s}{\overline{G}/G_s}. \tag{6}$$

An analogous term to a* is formed as, $$a'=1-|1-a|, \tag{7}$$

where $a' \leq 1$ for all materials. The terms a* and a' will vary with relative density due to geometric nonlinearities even in material geometries that have a*, a*'≈1 in a region of relative density.

The performance of two phased materials composed of a stiff dense phase and a void or gaseous phase, such as the cellular materials described herein, are limited by a suite of theoretical bounds. The theoretical upper bounds for bulk and shear moduli have been best described by Hashin and Shtrikman. The the Hashin-Shtrikman (H-S) bounds have been found to be the best, most rigorous, and most applicable to the systems described herein. The theoretical upper bounds for bulk and shear moduli are, $$\frac{K_{HSU}}{K_s} = \frac{4G_s(\overline{\rho}/\rho_s)}{4G_s + 3K_s(1-\overline{\rho}/\rho_s)}, \tag{8}$$

$$\frac{G_{HSU}}{G_s} = \frac{(9K_s + 8G_s)(\overline{\rho}/\rho_s)}{20G_s + 15K_s - 6(K_s + 2G_s)(\overline{\rho}/\rho_s)}. \tag{9}$$

Where $K_{HSU}$ and $G_{HSU}$ are the bounds on bulk and shear moduli respectively. A bound on Young's modulus is formed by assuming isotropic linear elasticity, $$E_{HSU} = \frac{9G_{HSU}K_{HSU}}{3K_{HSU} + G_{HSU}}, \tag{10}$$

and is a function of the upper bounds on bulk and shear moduli. These bounds are derived based upon energetic principles and limit the specific macroscopic strain energy of a material with a given relative density The term, $$\Omega = \frac{\overline{E}/E_s + \overline{G}/G_s + \overline{K}/K_s}{E_{HSU}/E_s + G_{HSU}/G_s + K_{HSU}/K_s}, \tag{11}$$

compares the performance of a material with properties $\overline{E}$, $\overline{G}$ and $\overline{K}$ to that of a material that achieves the theoretical bounds. This has a value of unity, $\Omega=1$, for a material that achieves the H-S bounds simultaneously where, $\overline{E}=E_{HSU}$, $\overline{G}=G_{HSU}$ and $\overline{K}=K_{HSU}$. By the formulation of these terms an isotropic material with $\Omega=1$ has a maximum specific strain energy density due to the bounds being calculated using strain energy functionals. This is a measure of the total stiffness of a material. A measure of total isotropic stiffness is calculated as, $$\Psi = a^*\Omega = \frac{a^*(\overline{E}/E_s + \overline{G}/G_s + \overline{K}/K_s)}{E_{HSU}/E_s + G_{HSU}/G_s + K_{HSU}/K_s}. \tag{12}$$

Where a material the achieves the H-S bounds simultaneously will have $\Psi \approx 1$. The H-S bounds are for isotropic and nearly isotropic materials and a material with $\overline{E}=E_{HSU}$ and $\overline{G} = G_{HSU}$ has a*≠1. This term will have the range of values Ψ≤1 due to a*≤1 for all materials, and Ω≤1 for these materials.

Figure 1A:
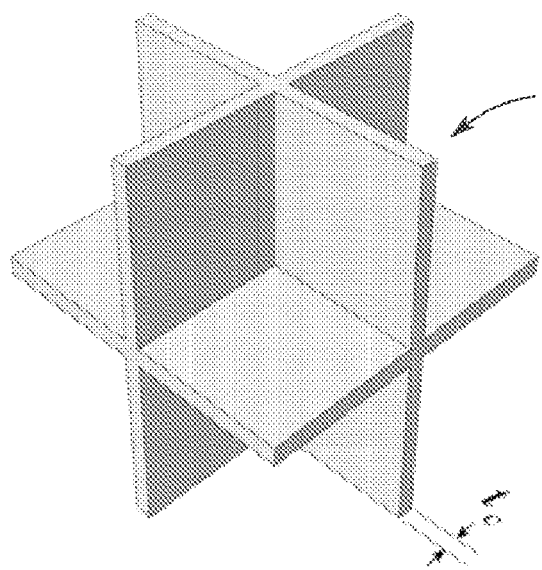
FIG. 1A depicts the cubic cell component of the base geometry of the unit cell of FIG. 1.
Figure 1B:
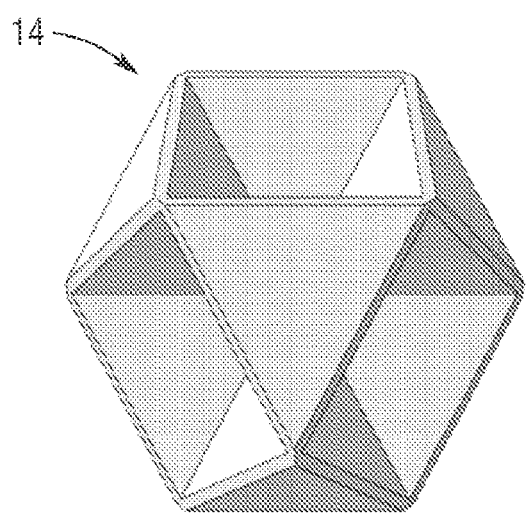
FIG. 1B depicts the tetrahedral cell component of the base geometry of the unit cell of FIG. 1.

Using these metrics a variety of materials have been analyzed and the following geometry identified. FIG. 1 shows an embodiment of the unit cell 10 of the claimed cellular geometry. This cellular geometry is formed from the combination of two highly anisotropic material geometries. One material geometry has a high Young's modulus and relatively low shear modulus, and the other a high shear modulus and relatively low Young's modulus. The two material geometries are a cubic cell, or box cell (CC) 12 (shown in FIG. 1A), and a recently discovered Octet-foam foam respectively. The Octet-foam is the closed cell version of the Octet-truss and is composed of cells that are octahedrons and regular tetrahedrons. This is referred to as the tetrahedral cell (TC) 14 (shown in FIG. 1B). While these material geometries have been previously identified, they have not been fully characterized, and their properties quantified in a manner that allows for them to be appropriately exploited. It is only through this elucidation that necessary insight is achieved to make the development embodied in this invention. The combination of the two geometries creates a unit cell 10 as shown that has voids that have distinctive geometries. A discussion of these void geometries is presented later in the discussion of FIGS. 39 through 41C. The unit cell 10 can be formed from a wide variety of materials including, but not limited to: metals, metal alloys, polymers, plastics, elastomers, ceramics, natural materials, composites, including but not limited to fiber and particulate reinforced composites and cermets, and cellular materials, including lattices and open and closed cell foams.

As shown in FIG. 1, the TC 14 components of the unit cell 10 are colored with a checkered pattern, CC 12 components are left uncolored. Cell edges 16, defined by the material at the intersection of the cell walls of the component geometries, are in thick black lines. The intersection of the CC 12 components with the boundaries of the cubic volume element are represented by dashed lines. In FIG. 1 the cell walls of the CC 12 and TC 14 components and the cell edges 16 are depicted without thickness but will have a finite thickness when fabricated.

Figure 2:
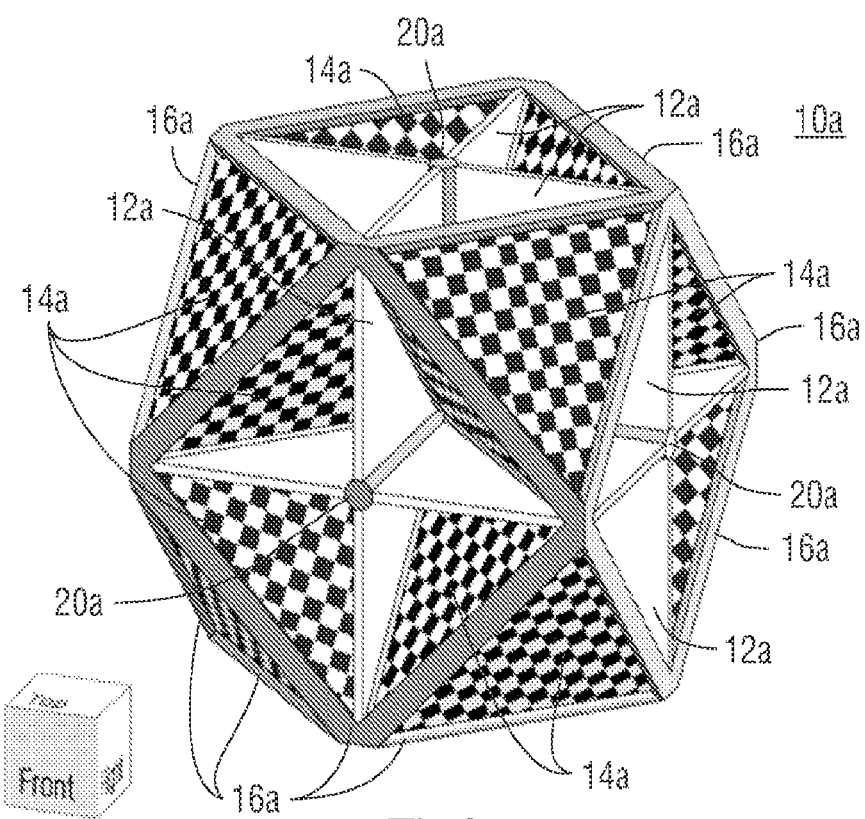
FIG. 2 depicts an embodiment of unit cell with variations between cell edge and cell wall thicknesses.
Figure 3:
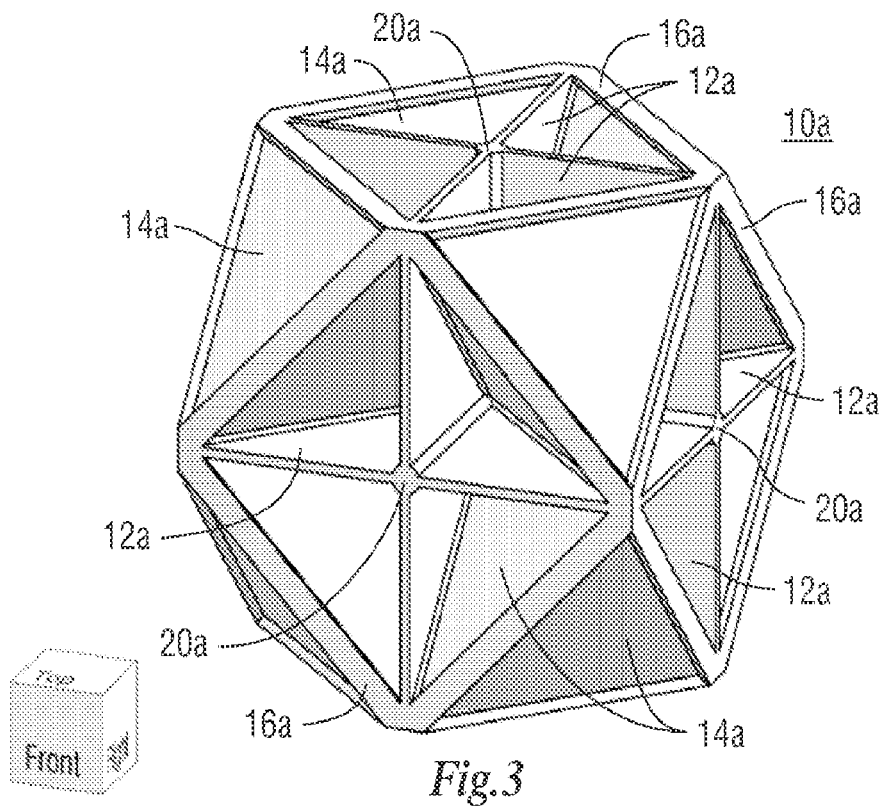
FIG. 3 depicts the unit cell of FIG. 2 without the divisive coloration.

FIG. 2 shows a closed cell embodiment of the unit cell 10a. TC 14a components are colored with a checkered pattern, CC 12a components are left uncolored, and cell edges 16a are colored grey. The thickness and geometry of cell edges 16a and the cell walls of the CC 12a and TC 14a component can vary independently. The cross-sectional geometry of the cell edge 16a components are depicted with a circular cross section 20a, but can be of any geometry, and this geometry can vary along the length of the cell edge. The thickness of the TC 14a and CC 12a components can be of different values. It will be advantageous in many applications to vary the thickness of the cell walls of the CC 12a components between neighboring cell walls and within an individual cell wall of the TC 14a and CC 12a components. It may also be advantageous to change the geometry of cell walls of the TC 14a and CC 12a components, making them non-planar, or placing one or many holes in the cell faces or edges to facilitate fluid transport between neighboring cells. It may also be advantageous in some applications to replace edge material or face material with a device, such as a strain measuring device or active valve, or to connect such a device to a unit cell 10a. In some embodiments (not shown) a device may be embedded within a unit cell. FIG. 3 shows the same embodiment of FIG. 2 without the coloration.

Figure 4:
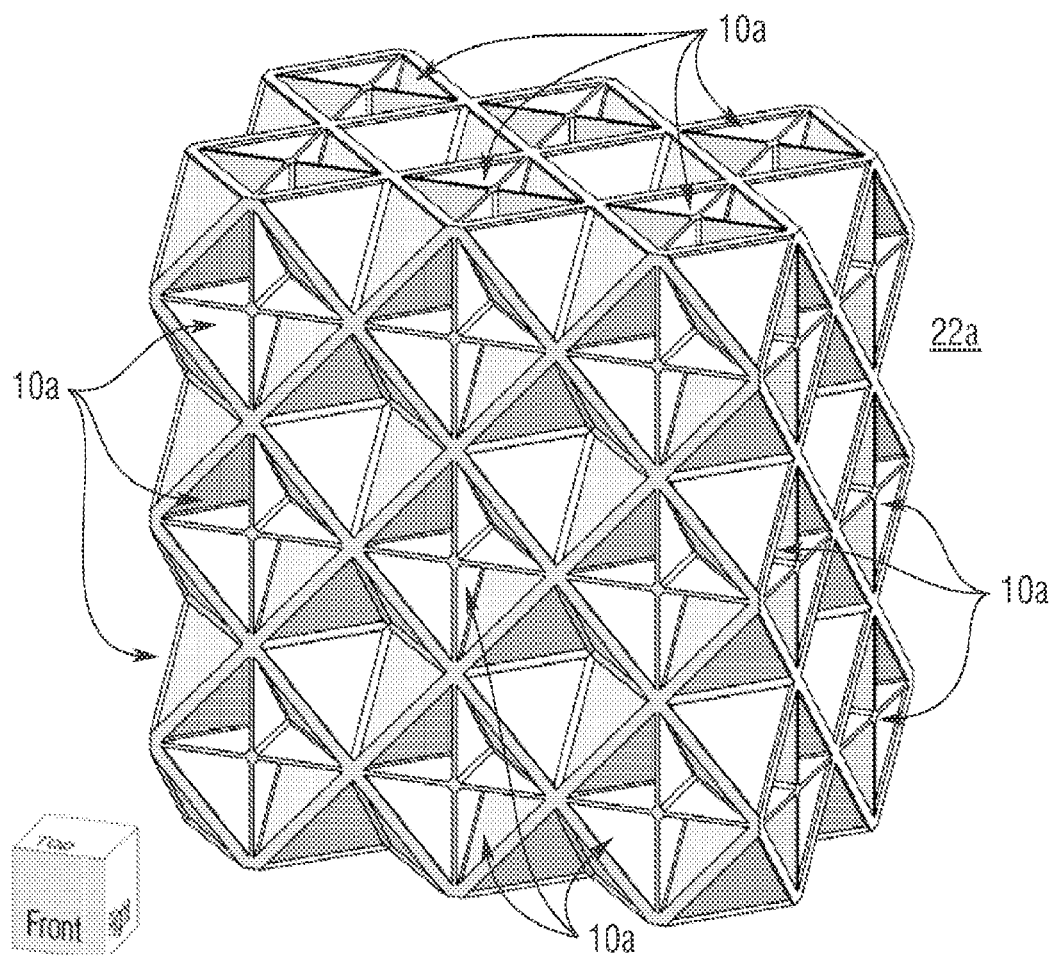
FIG. 4 depicts an assembled structure comprising a plurality of unit cells as shown in FIG. 3.

Each of the unit cells shown above can be assembled or constructed into a structure of coherently iterative cells using a variety of construction methods. For example, the unit cells can be constructed with systems that remove material or by bonding selected materials by welding, adhesives, brazing or other joining methods or by using investment casting, or 3-D printing direct manufacturing methods described above,. For example, FIG. 4 shows an assembled structure 22a that comprises multiple copies of the unit cell 10a shown in FIGS. 2 and 3. In the embodiment shown, eighteen unit cells 10a form the assembled structure 22a but it will be understood that any number of unit cell and different types of unit cells may be assemble to form any configuration of structures as needed. FIGS. 4A through 4D show front, isometric, bottom, and right views, respectively of the assembled structure 22a of FIG. 4.

Figure 5:
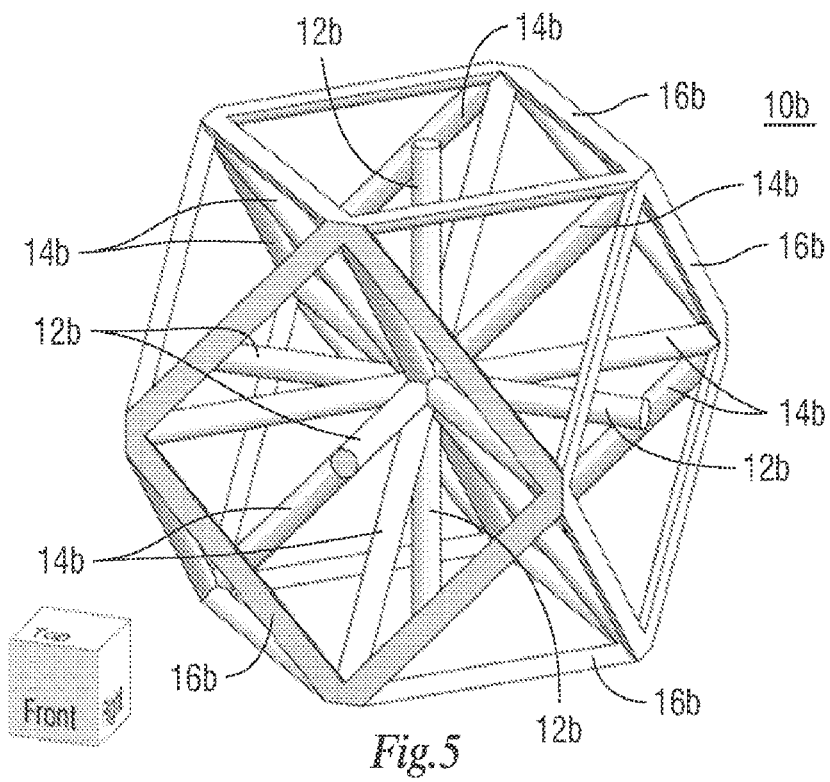
FIG. 5 depicts an embodiment of unit cell having a zero cell wall thickness and only cell edge material.

FIG. 5 shows an open cell embodiment of the unit cell 10b in which the cell wall thickness is zero and the cell edges 16b are the same thickness as the embodiment shown in FIGS. 2 and 3 (although it will be understood that this thickness may also be varied as needed). With the cell walls removed, fluid transport is maximized between neighboring cells. Fluid transport is useful in many applications for cellular materials. This open cell embodiment can be coherently joined to the closed cell embodiment, previously shown. It will be understood that the unit cell 10b could be constructed such that only some selected cells walls have a zero thickness such that the unit cell 10b is partially open. Such embodiments would allow the creation of fine-tuned assembled structures with directed flow paths as needed for the particular application.

Figure 6:
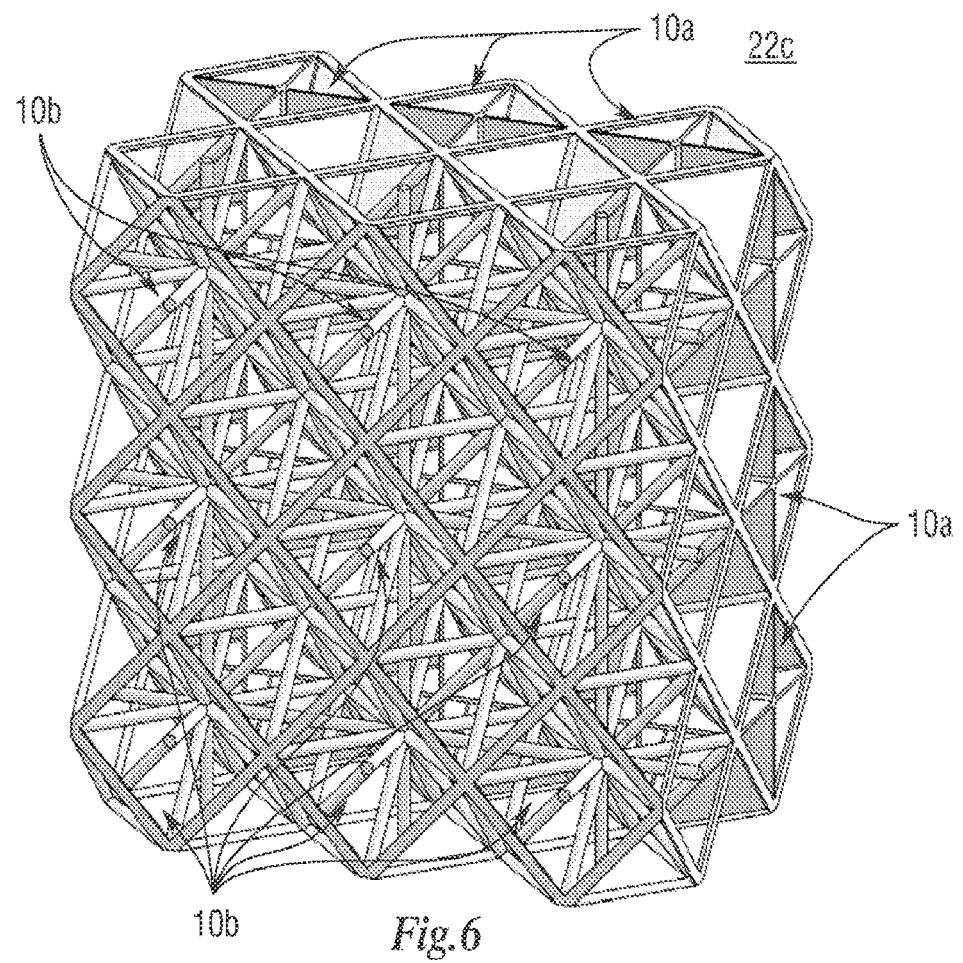
FIG. 6 depicts an assembled structure comprising a plurality of unit cells comprising embodiments of unit cells shown in FIG. 3 and FIG. 5.

FIG. 6 shows an embodiment of an assembled structure 22c that incorporates the closed cell embodiment of unit cell 10a shown in FIGS. 2 and 3 and the open cell embodiment of unit cell 10b shown in FIG. 5. The open and closed cell embodiments can join coherently, allowing fluid transport between some cells and not others. FIGS. 6A through 6D show top, isometric, front, and right views, respectively of the assembled structure 22c of FIG. 6.

Figure 7:
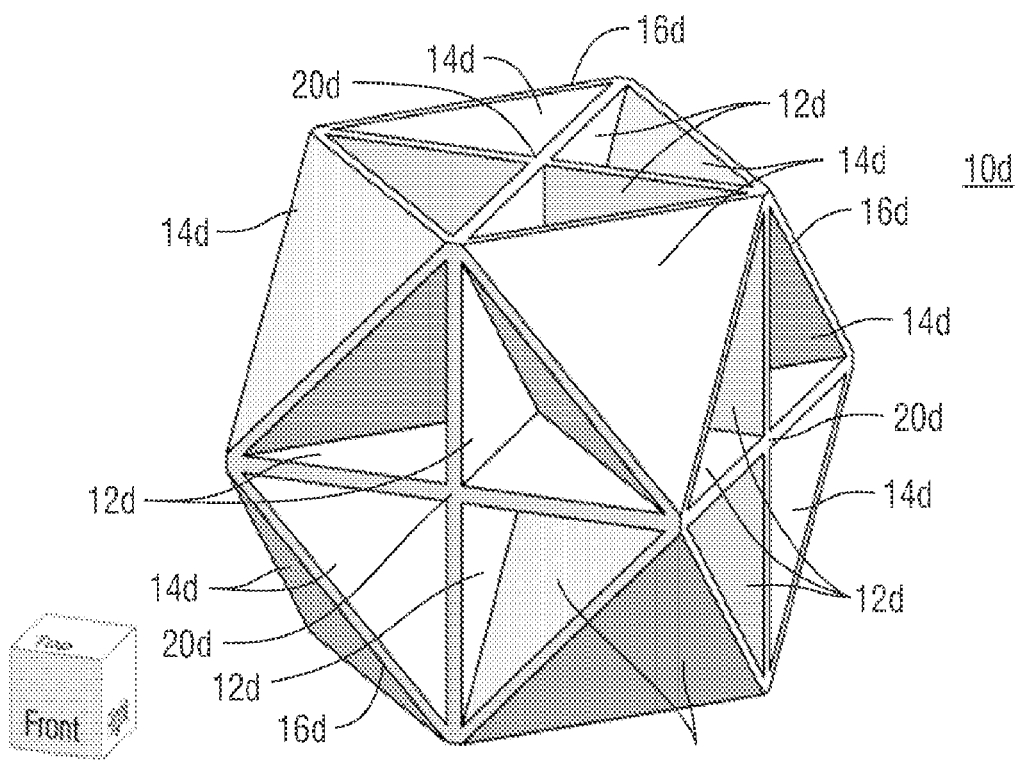
FIG. 7 depicts an embodiment of unit cell that has isotropic or nearly isotropic stiffness.

The simplest embodiment of the unit cell has isotropic or nearly isotropic stiffness. An example of such an embodiment of unit cell 10d is shown in FIG. 7. In this case, the ratio of the wall thickness is $t_c/t_t = \sqrt{3}$, where $t_c$ is the wall thickness of the CC 12d walls and $t_t$ is the thickness of the TC 14d walls. The geometry is fully determined by selecting one of $t_t$, $t_c$ or the relative density ($\overline{\rho}/\rho_s$). In this configuration the material is nearly isotropic, with near maximal stiffness.

Figure 18C:
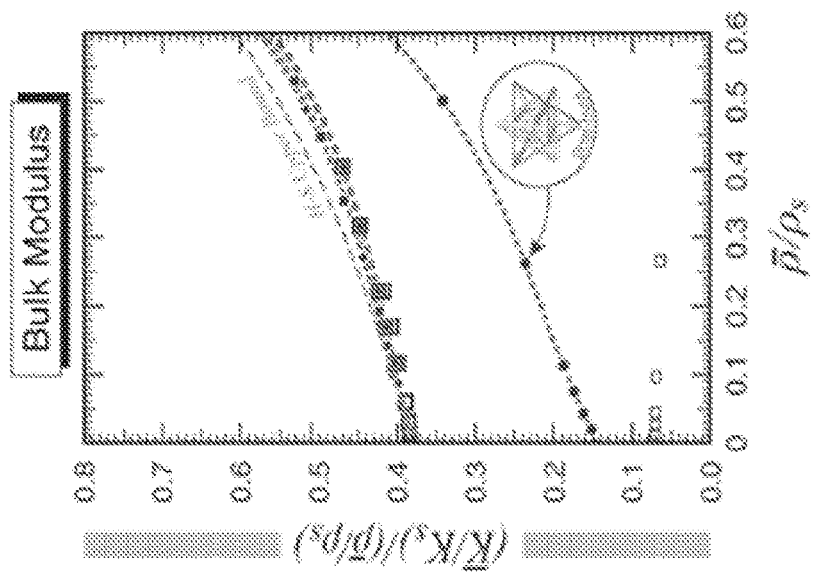
FIG. 18C is a plot of finite element analysis for bulk modulus for a variety of cell types.
Figure 18B:
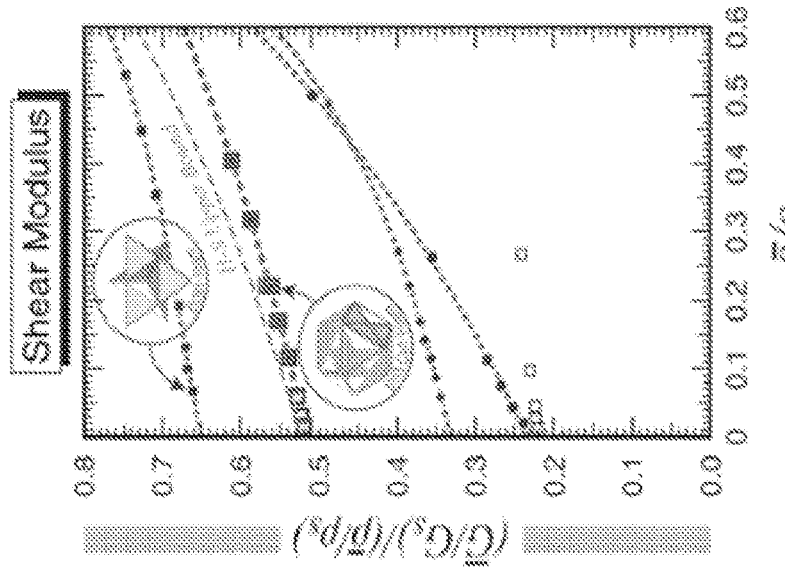
FIG. 18B is a plot of finite element analysis for shear modulus for a variety of cell types.
Figure 18A:
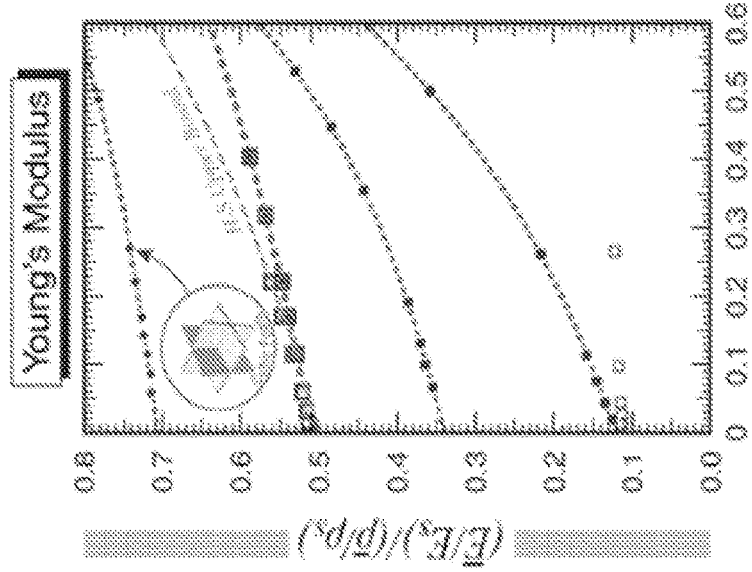
FIG. 18A is a plot of finite element analysis for Young's modulus for a variety of cell types.
Figures 24, 25:
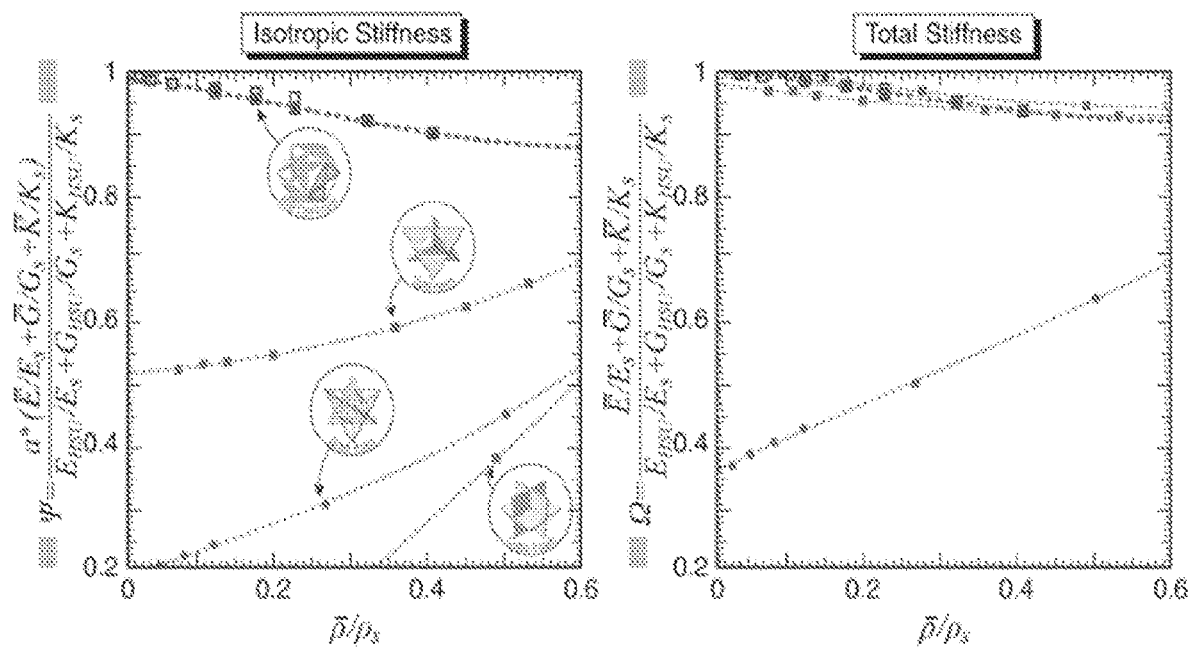
FIG. 24 is a plot of isotropic stiffness for a variety of cell types.
FIG. 25 is a plot of total stiffness for a variety of cell types.

Finite elements results for the Young's, shear, and bulk moduli for this embodiment are plotted in FIGS. 18A-C, respectively as a function of relative density. The Poisson ratio of the constituent material, $v_s = 0.3$, is typical of many metals and alloys. The Poisson ratio of the constituent material is not known to heavily influence the performance of cellular materials. This embodiment achieves a large fraction of the suite of theoretical bounds over the range of relative densities plotted. For comparison the results for the cubic foam (CF), Octet-foam (TC) and the Octet-truss are included. Results for shell finite elements (large open squares) and solid finite elements (large filled squares) for assembled structures comprising unit cells disclosed herein converge at $\overline{\rho}/\rho_s \approx 10\%$. The Hashin-Shtrikman (H-S) upper bounds are plotted in the thin dashed lines. The assembled structures comprising unit cells disclosed herein achieve a large fraction of theoretical upper bounds over the range of relative densities plotted, converging towards the bounds as cell walls become thinner and the relative density approaches zero, $\overline{\rho}/\rho_s \to 0$. Results for CF and TC, the two sub-geometries of the unit cell disclosed herein, are shown in the small diamonds and small squares respectively. They are both highly anisotropic and so the theoretical bounds do not apply. Results for the Octet-truss are plotted in small circles. The relative density for each material varies with the wall thicknesses, $t_c$ and $t_t$ for the CF and TC respectively (the subscript t is in reference to the tetrahedral cells of the TC) or the strut thickness in the OT. The CF (small diamonds) has a high Young's modulus (FIG. 18A) and relatively low shear modulus (FIG. 18B). The TC (small squares) conversely has a high shear modulus (FIG. 18B) and low Young's modulus (FIG. 18A). A comparable trade off in Young's and shear modulus is seen in the CF and TC geometries. Noting that they have roughly the same bulk modulus (FIG. 18C), suggests these highly anisotropic materials have a limited performance limited by the H-S bounds, which is for nearly isotropic materials. To quantify this the total stiffness (Equation 11) is plotted in FIG. 25, where the CF and TC have nearly identical total stiffnesses and appear to be limited, in a manner, by the H-S bounds, despite their anisotropy. While the CF and TC have a high total stiffness their isotropic stiffness (Equation 12) is low (FIG. 24).

In the plots in FIGS. 18A and 18B, the stiffnesses of the CF and TC have Young's and shear moduli that lie roughly equidistant from the theoretical upper bounds, trading off Young's and shear stiffness. Through this characterization it becomes possible to identify the assembled structures comprising unit cells that possess the combined properties by combination of the two geometries. The bulk modulus of the CF, TC, and the unit cells described herein are nearly identical, and achieve a large fraction of theoretical bounds (as seen in FIG. 18C).

The invention disclosed herein is seen to have a total stiffness (FIG. 25) and isotropic stiffness (FIG. 24) that approach unity as the relative density approaches zero. The total stiffness of the invention achieves more than 90% of the theoretical upper bounds, $\Omega > 0.9$, over the range of relative densities plotted. One of the primary areas of application for cellular materials is in the lightweight, low density regime, $\bar{\rho}/\rho_s \leq 0.2$, wherein the invention achieves more than 97%, of the total theoretical bounds, $\Omega > 0.97$.

The results in FIGS. 18A-C are most easily interpreted in terms of the stretching component of the material response. In the low density limit, $\bar{\rho}/\rho_s \rightarrow 0$, the bending stiffness of members in negligible. With this in mind, the y-intercepts in the plots in FIGS. 18A-C can be viewed to indicate the fraction of material contributing to the macroscopic stiffness through stretching. The CF, for example, has two out of the three walls aligned with a load applied normal to the unit cell faces. The y-intercept in FIG. 18A is then approximately two thirds. The other small contribution to the stiffness in this case comes from the Poisson effect and stretching of the walls orthogonal to the applied load. The distribution of strain energy in FIG. 19A illustrates this partitioning. In the CF shear case, one of three walls is aligned with the principle stresses (FIG. 19B) and the y-intercept is $\sim\frac{1}{3}$ (FIG. 18A). For a material with cubic symmetry the CF will have the highest Young's modulus due to all of the material being equally aligned with each of the three axes and the principle stresses. The TF has the converse property. The cell walls are aligned with the principle stresses under shear loading resulting in deformations that are stretching dominated. The strain energy distribution in the cell walls in this scenario are correspondingly uniform (FIG. 20B). These two highly anisotropic but efficient materials are combined, in the unit cell disclosed herein (FIG. 21A-C), to form a material capable of having maximum isotropic stiffness.

For comparison the Octet-truss (OT) (FIGS. 22A-C) is included in the results. The OT is a fully triangulated truss structure composed of beam or truss elements of equal length, and is uniquely defined as such. This is significant in that truss structures as bending dominated. Members of equal length have equal bending stiffness and strength resulting in relatively uniform macroscopic material properties. The Octet-truss is stiffest and strongest under shear loading (FIG. 22B) where ⅓ of the members are aligned axially with the principle stresses. Under axial loading (FIG. 22A) all members are subject to equivalent bending. Deformations under hydrostatic loading (FIG. 22C) are largely affine (no bending), however, the bulk stiffness is low (FIG. 18C). This is due to the need to have local hydrostatic confinement to produce macroscopic bulk stiffness. The material in truss members can expand in the plane transverse to its axis while material in cell faces can only expand in the face normal direction. The overall performance of the Octet-truss, while good when compared to other open cell materials, does not rival the performance of the unit cell disclosed herein.

Figure 23:
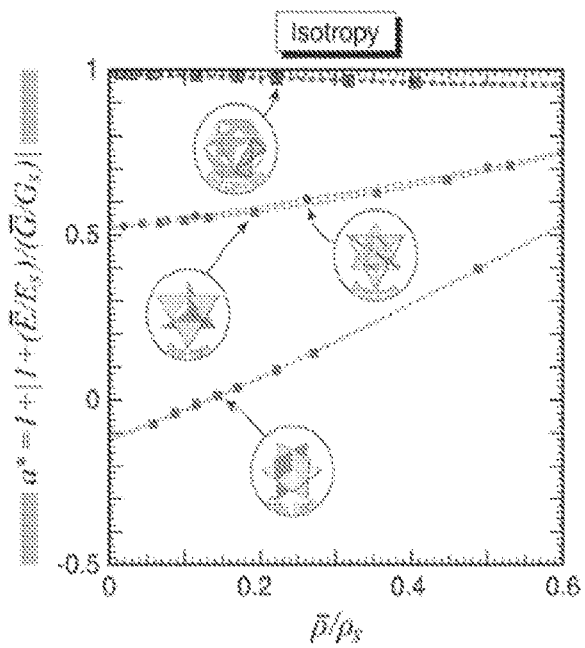
FIG. 23 is a plot of isotropy for a variety of cell types.

FIG. 23 shows the isotropy parameters a* (Eq. 5) for the invention disclosed herein, the two constituent geometries and the Octet-truss. The invention material is nearly isotropic over the range of relative densities plotted. The ratio of wall thicknesses, $t_c/t_t$, can vary, however, to alter the anisotropy, which will be advantageous in some applications.

Figure 26:
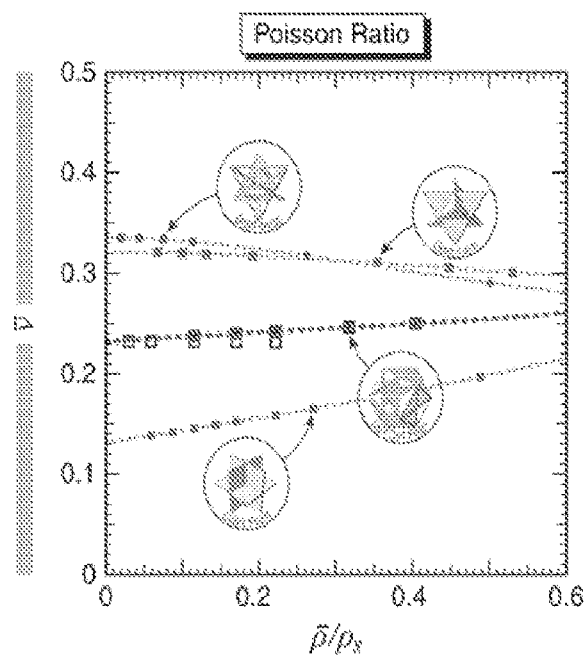
FIG. 26 is a plot of Poisson ratio for a variety of cell types.

FIG. 26 shows the Poisson ratio for the five material geometries previously mentioned. The Poisson ratio of the invention, $\bar{v} \approx 0.25$, is does not vary substantially with relative density over the range plotted.

Representative strain energy distributions for the three loading scenarios are plotted in FIGS. 19A-22C; uniaxial compression (FIGS. 19A, 20A, 21A, and 22A), pure shear (FIGS. 19B, 20B, 21B, and 22B), hydrostatic compression (FIGS. 19C, 20C, 21C, and 22C). The geometries are the CF (FIGS. 19A-C), OF (FIGS. 20A-C), the unit cell disclosed herein (FIGS. 21A-C) and Octet-truss (FIGS. 22A-C). Strain energy density is normalized by the macroscopic (average) strain energy density. The strain energy distributions are in evidence of the stiffnesses shown in FIGS. 18A-18C. The applied strains are small and well within the linear elastic regime but are scaled for clarity to show the deformations. Under hydrostatic loading (FIGS. 19C, 20C, 21C, and 22C) the deformations consist primarily of member thickening due to the Poisson expansion of walls under compression. (Negative strain energies are fictitious.). Uniform strain energy distribution in members and strain energy densities near the average value (1.0) are indicative of high performance. Conversely, non-uniform strain energy is indicative of bending and low performance while higher substantially higher than average strain energy densities are indicative of localization and low performance. Strain energy is well distributed in the invention ($3^{rd}$ row) in all three loading scenarios.

Figure 8:
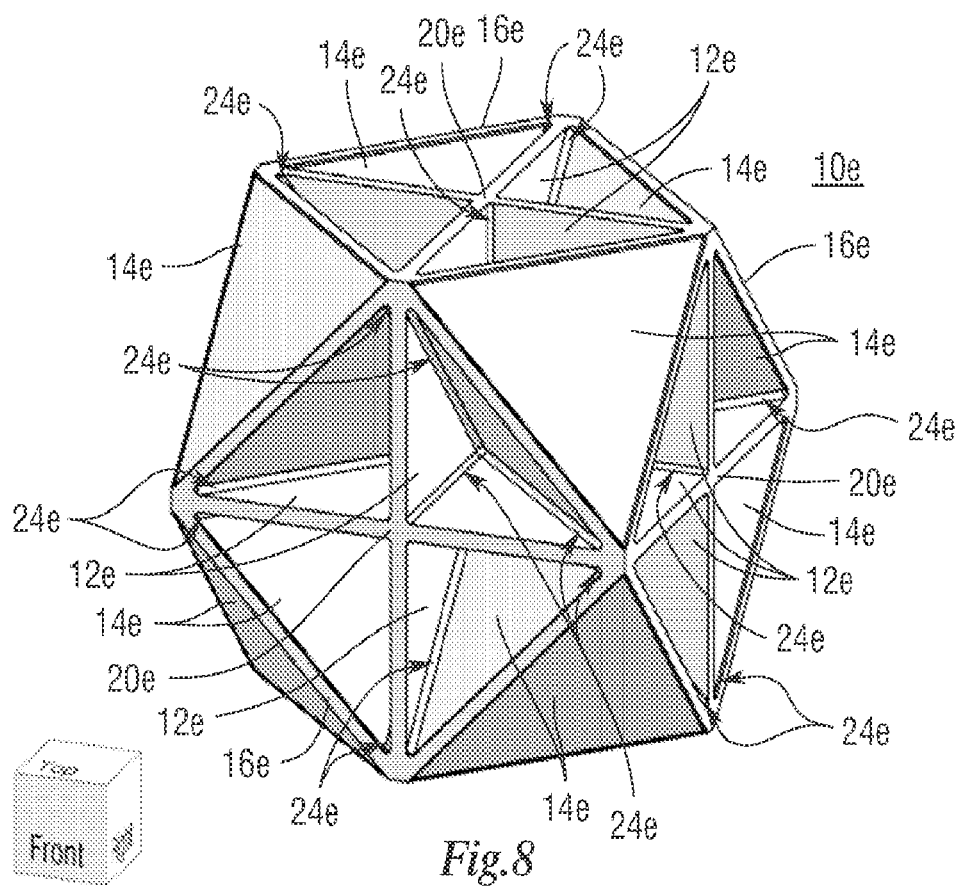
FIG. 8 depicts an embodiment of unit cell that has isotropic or nearly isotropic stiffness with the addition of fillets.
Figure 9:
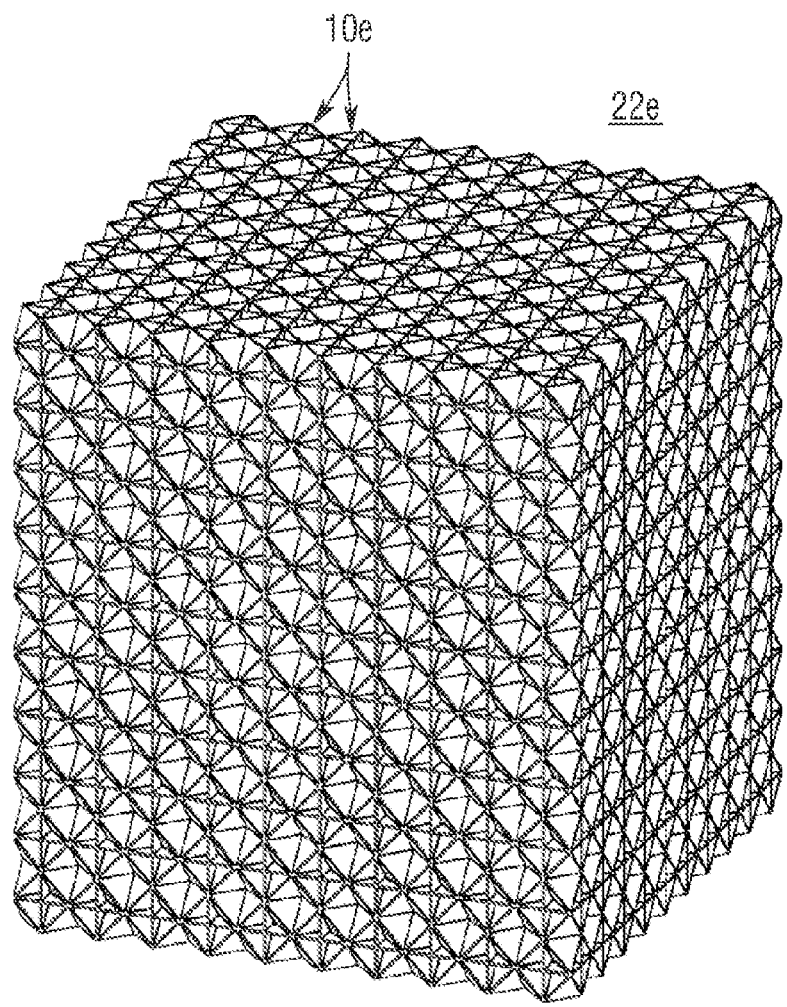
FIG. 9 depicts an assembled structure that comprises an array of the unit cells depicted in FIG. 8.

FIG. 8 shows another embodiment of unit cell 10e which is similar to the embodiment depicted in FIG. 7 with the addition of narrow bands of material along the cell edges, or fillets 24e. Fillets 24e are used to blunt stress concentrations. This embodiment is representative of a general embodiment with added geometric complexity yet retains the essential features of the basic embodiment. FIG. 9 shows an assembled structure 22e comprising an array of a plurality of unit cells 10e shown in FIG. 8. The periodicity of such an assembly of unit cells 10e may be arbitrarily large and is dependent only on the fabrication technique and desired properties.

Figure 10:
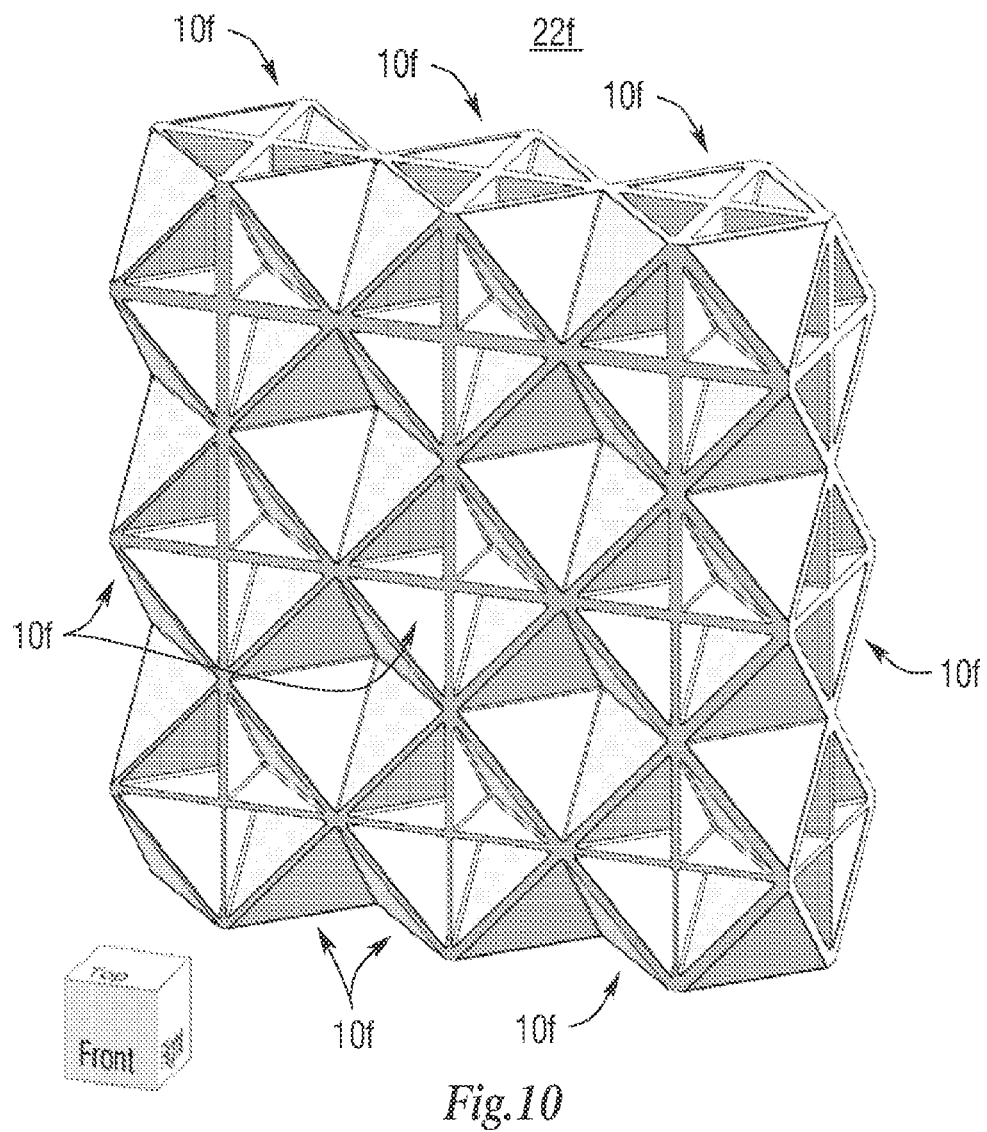
FIG. 10 depicts an embodiment of assembled structure in which the structural properties of the unit cells it comprises vary.

The anisotropy of the substructures can be exploited to produce designs that can be tailored for a particular purpose. For Example, FIG. 10 shows an embodiment of assembled structure 22f where the properties of the material vary from left to right and from top to bottom in different manners. FIGS. 10A through 10E show top, left, front, right and bottom views, respectively of the assembled structure 22f of FIG. 10. The assembled structure 22f comprises nine unit cells that have varying wall thickness for the TC and CC walls. From the left to right direction, the TC walls thicken, increasing the shear stiffness and strength of each unit cell 10f. From the bottom to the top direction, the CC walls thicken, increasing Young's modulus (axial stiffness) and axial strength of the unit cell 10f. These systematic gradations in properties are only possible because of the anisotropic properties of the cubic and tetrahedral substructures. The ability to tailor the properties in a straightforward systematic way that produce such efficient results allows for the design of extremely efficient, tailored structures.

Figure 11:
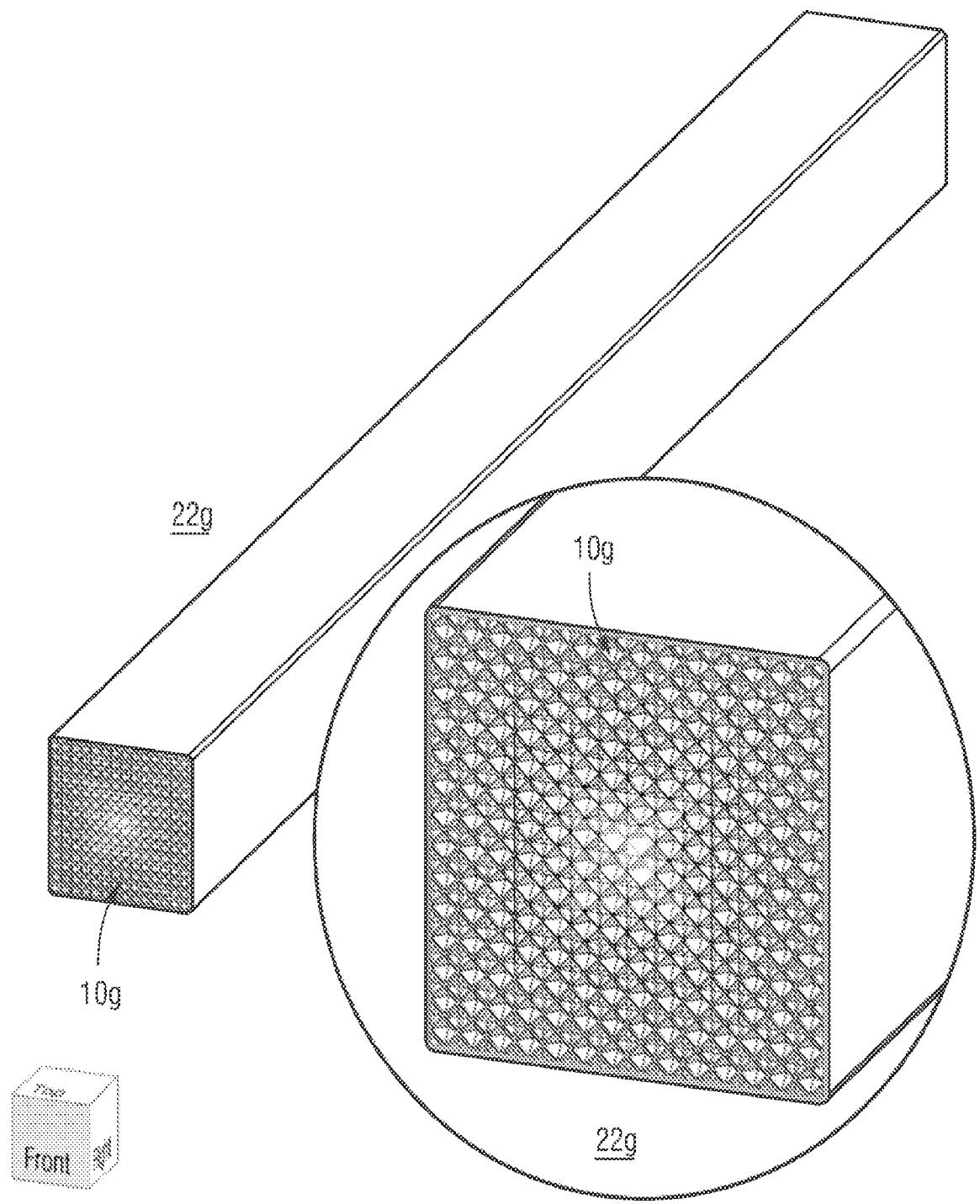
FIG. 11 is an embodiment of assembled structure that is a beam system.
Figure 11A:
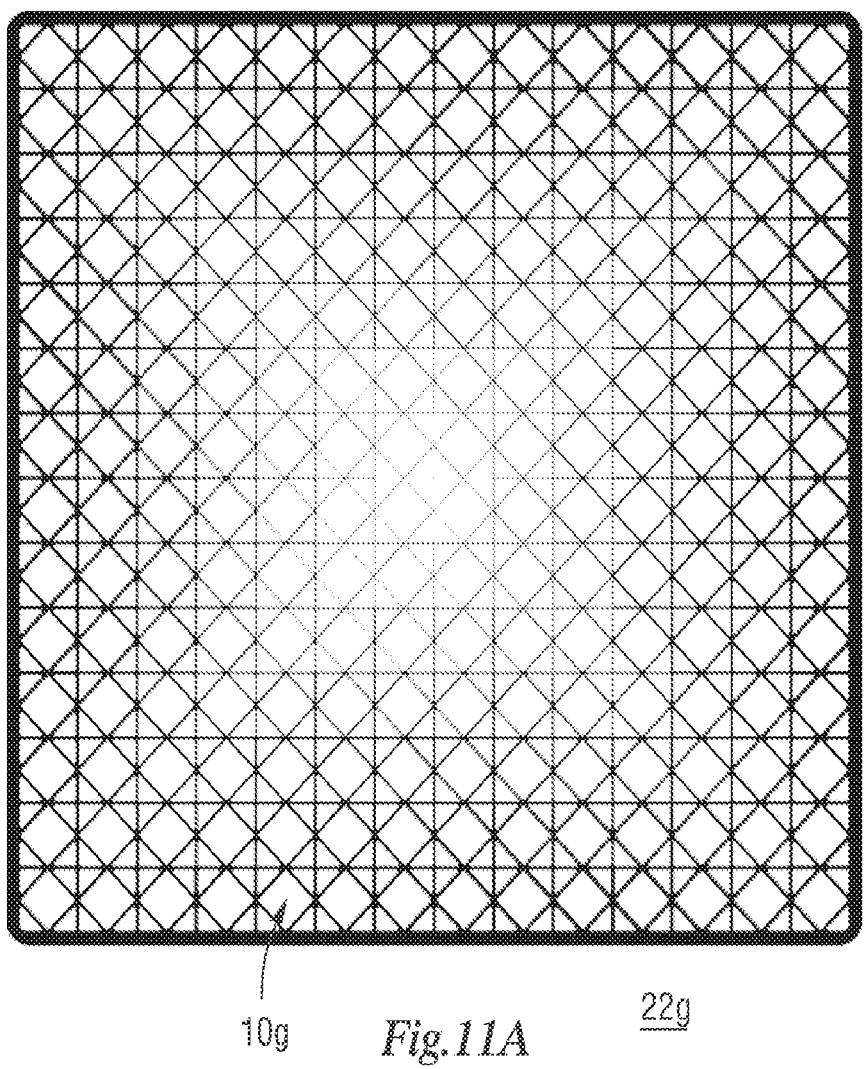
FIG. 11A is an end section view of the beam system of FIG. 11.

FIG. 11 shows embodiments of the unit cell 10g in an assembled structure 22g that is the core material of a beam system. Beams are commonly used in engineered systems to support loads. Examples of beams include the frame member of a bicycle, a strut in a suspension linkage, or a structural beam in a high-rise building. Biological beam systems like human bones and the trunks of palm trees are composed of material that is graded in density. This can be replicated in the assembled structure 22f as shown for example in the embodiment depicted in FIGS. 10 though 10E. In FIG. 11, the density of the assembled structure 22g increases towards the periphery where stresses are highest when the beam is subject to bending. The denser material is stronger increasing the strength of the beam system. The denser material near the periphery of the assembled structure 22g may also increase the transverse crushing strength of the beam. FIG. 11A shows an end-section of the assembled structure 22g system depicted in FIG. 11. The material is graded, with the relative density of the unit cells 10g lowest in the interior, increasing toward the perimeter of the assembled structure 22g. Gradation of unit cells 10g can facilitate high performance designs by lowering structural mass in non-critical locations. The thickener unit cells 10g on the periphery of the assembled structure 22g helps with robustness and strength in areas prone to failure.

Figure 12:
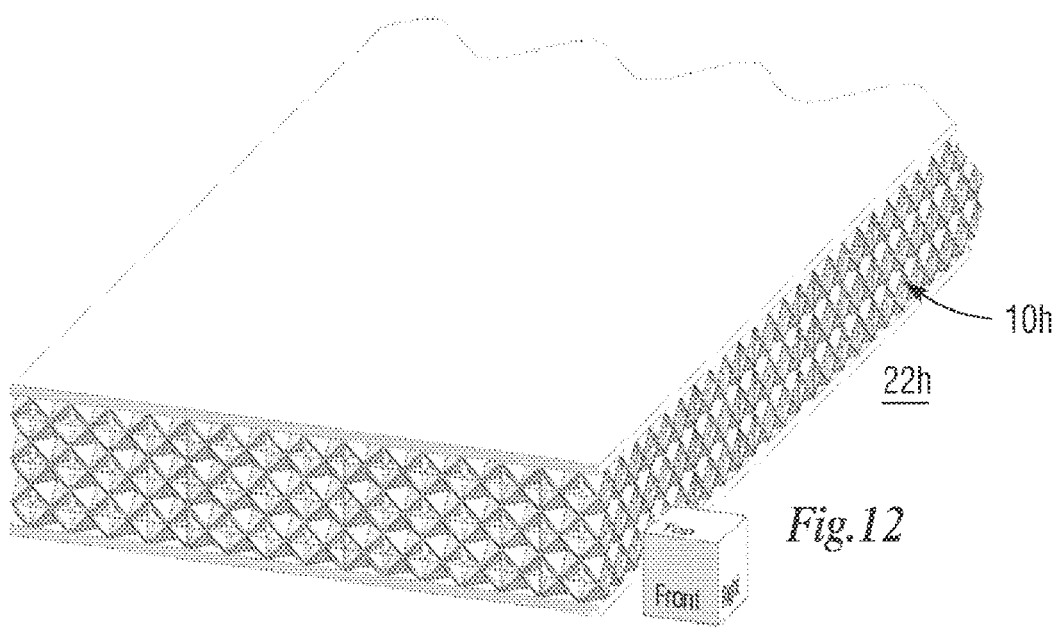
FIG. 12 is an embodiment of assembled structure that is a sandwich panel.
Figure 12A:
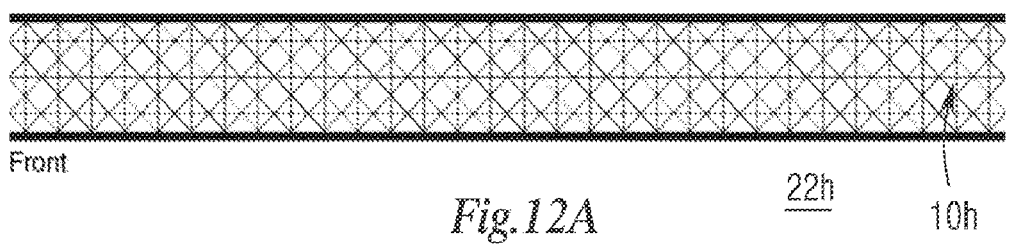
FIG. 12A is an front view of the sandwich panel of FIG. 12.

FIG. 12 depicts another embodiment of assembled structure 22h in a sandwich panel with the unit cells 10h as the core material. The utility of sandwich panel designs is well known. FIG. 12A depicts a front section of the assembled structure 22h.

Figure 13:
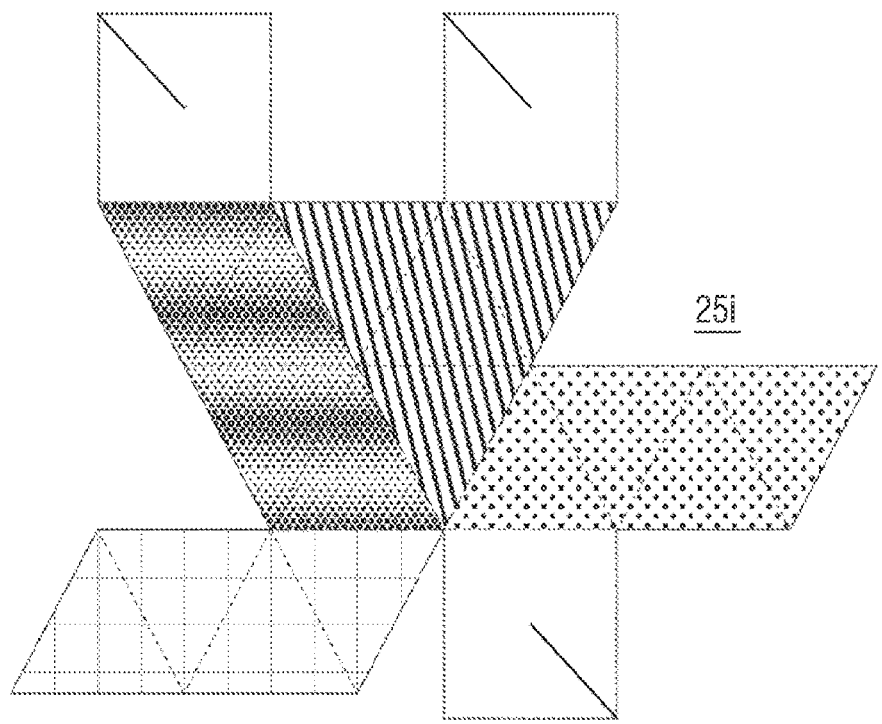
FIG. 13 is an example of a planar pattern that can be cut and folded into a portion of an embodiment of a unit cell.
Figure 13A:
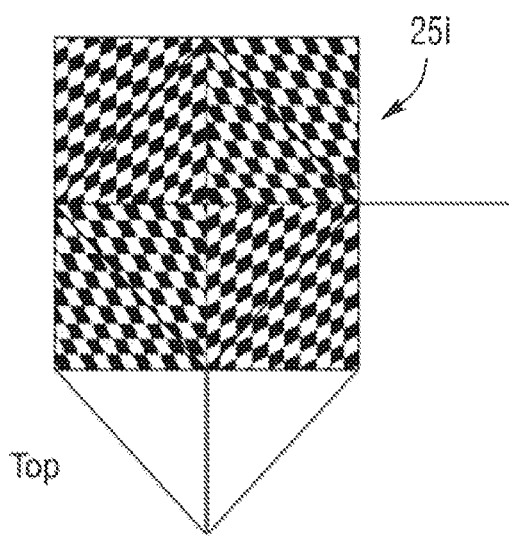
FIG. 13A shows a top view of the planar pattern of FIG. 13 folded into a half of a unit cell.
Figure 13B:
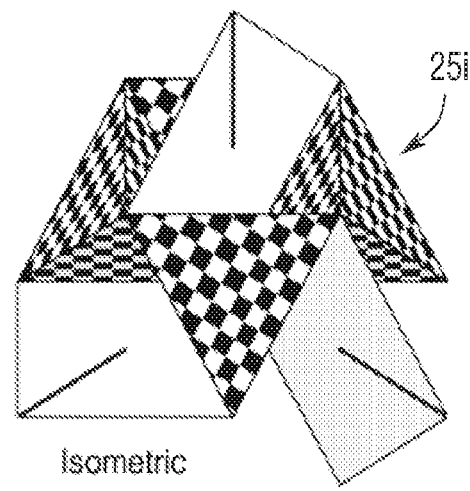
FIG. 13B shows an isometric view of the planar pattern of FIG. 13 folded into a half of a unit cell.
Figure 13C:
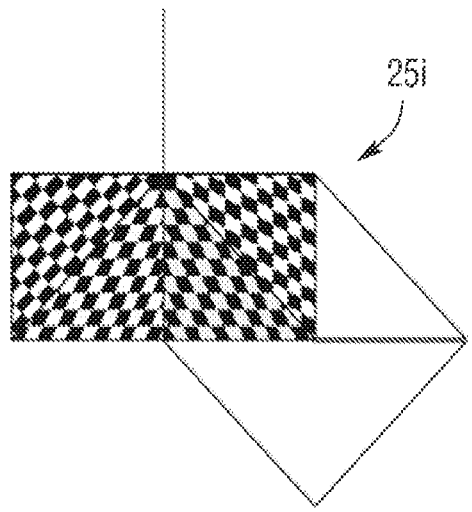
FIG. 13C shows a front view of the planar pattern of FIG. 13 folded into a half of a unit cell.
Figure 13D:
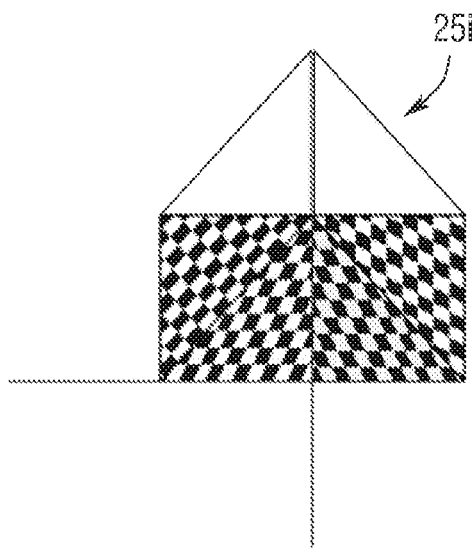
FIG. 13D shows a right view of the planar pattern of FIG. 13 folded into a half of a unit cell.
Figure 13E:
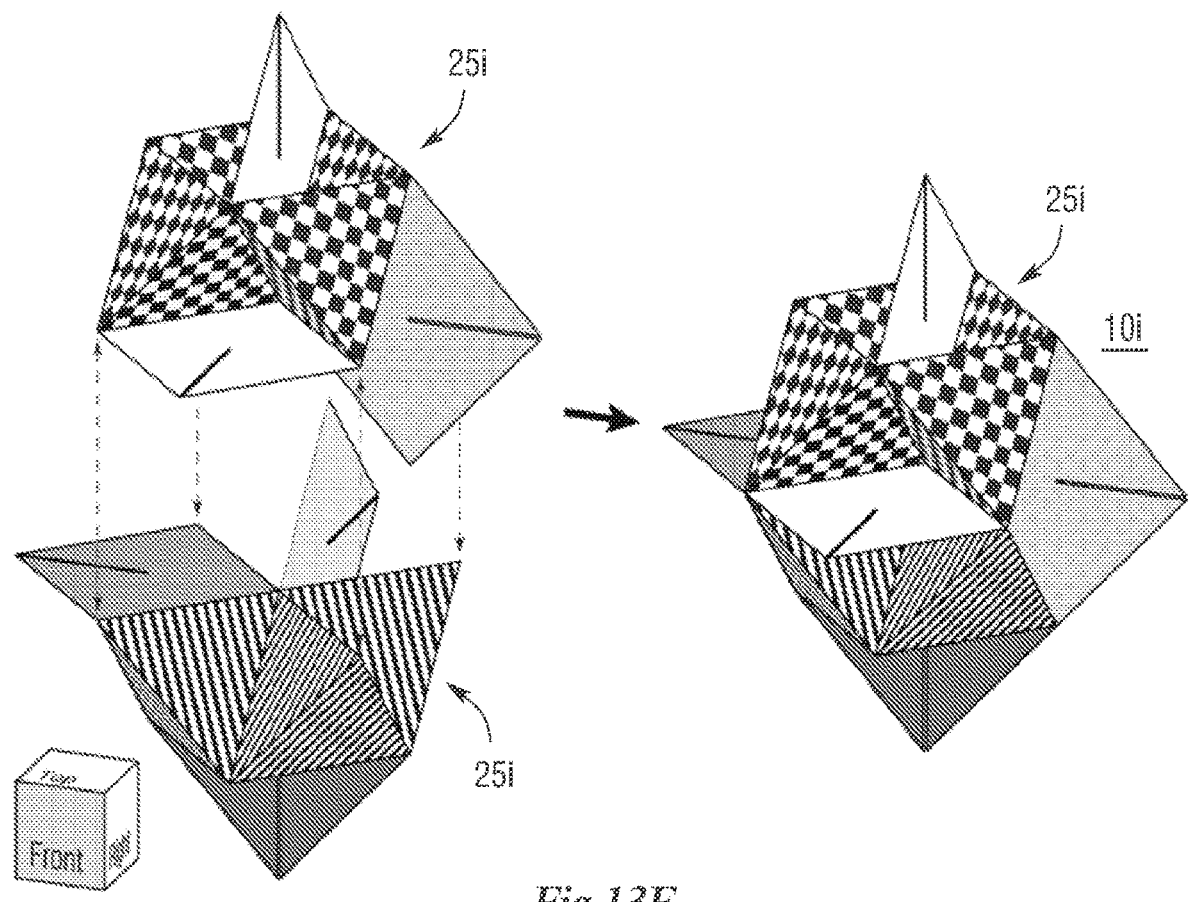
FIG. 13E shows two of the folded planar patterns of FIG. 13A combined to form a unit cell.
Figure 13F:
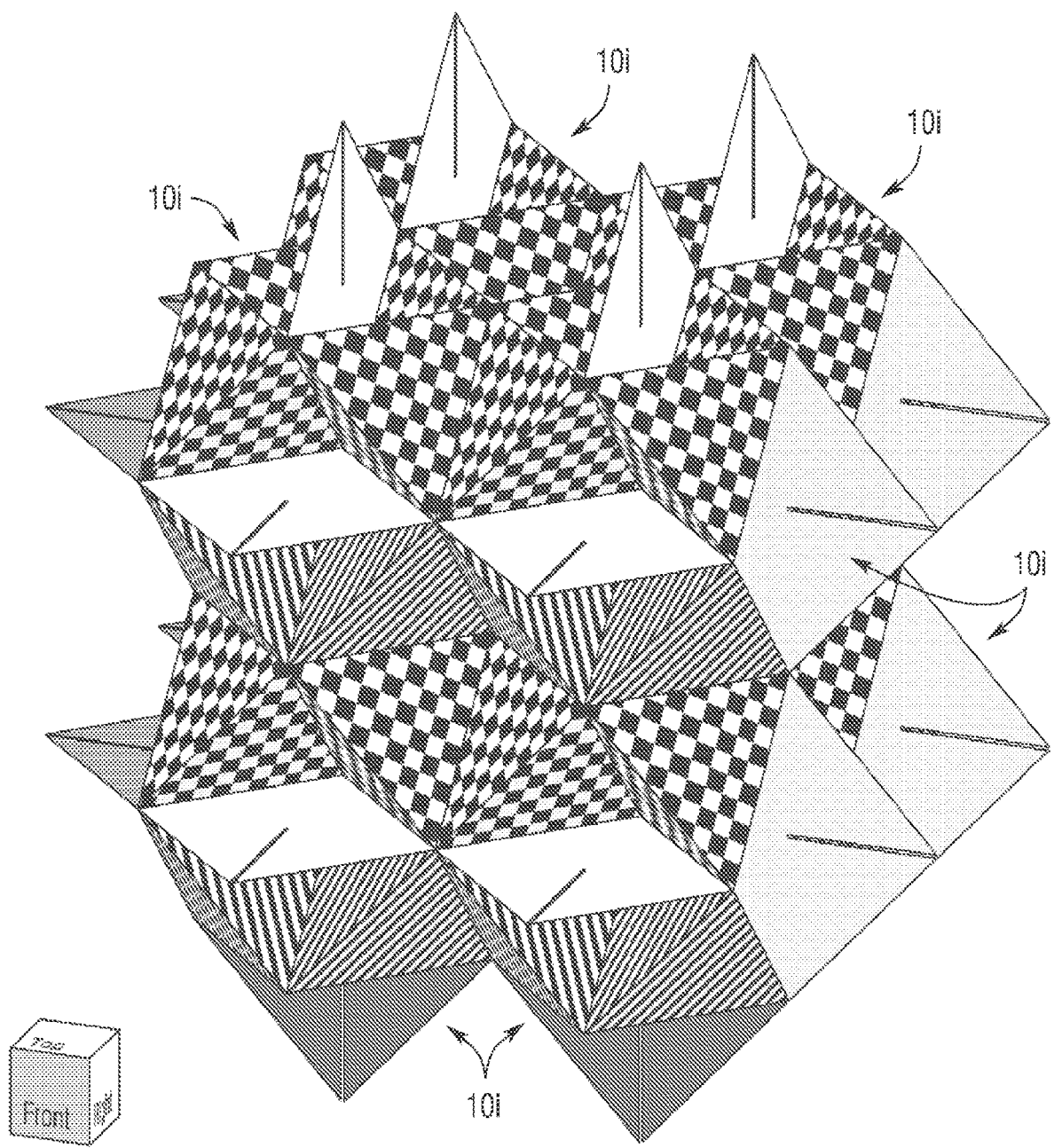
FIG. 13F shows a completed assembled structure formed from interlocking a plurality of unit cells created from a plurality of the planar patterns of FIG. 13
Figure 13G:
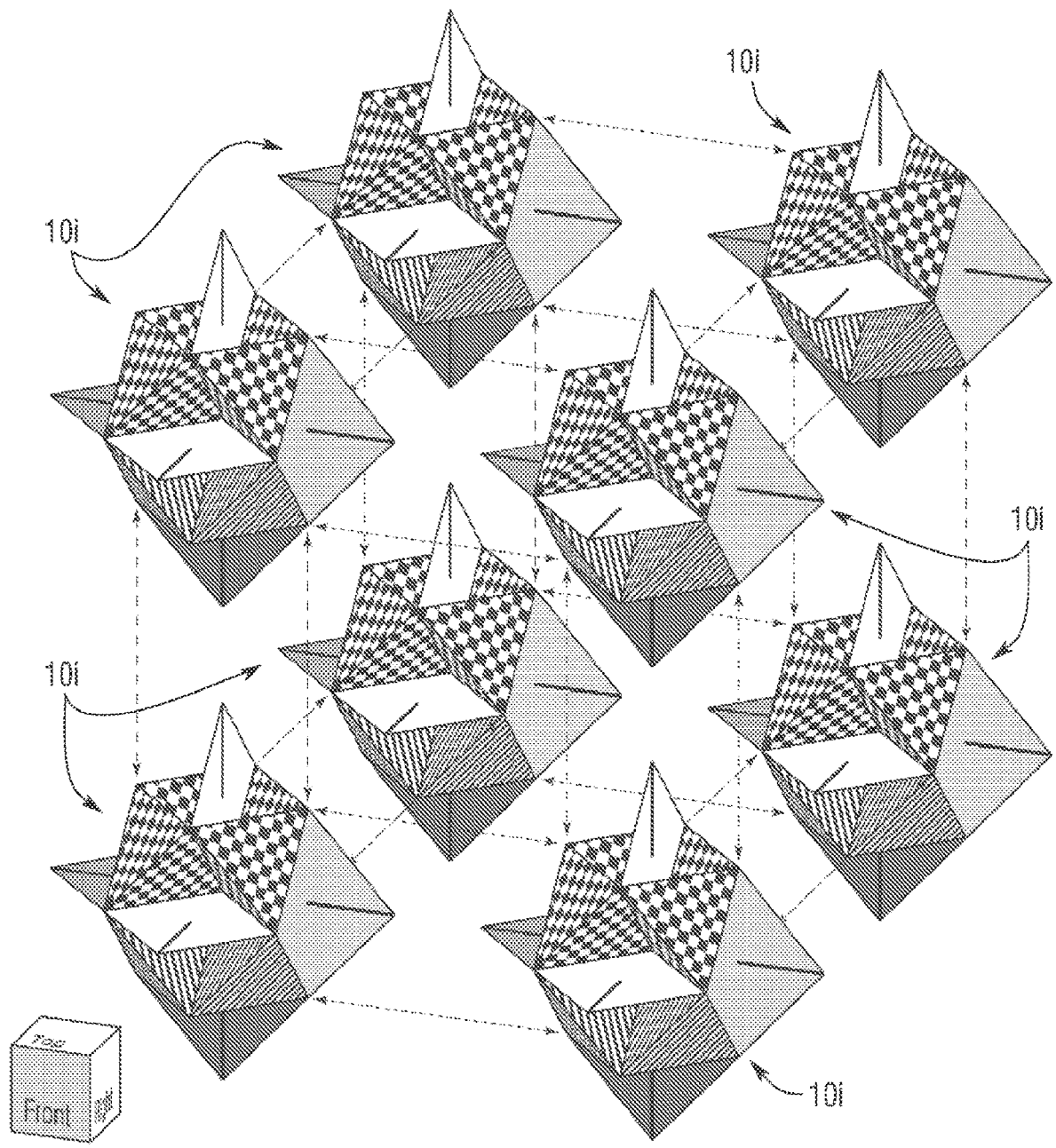
FIG. 13G shows how the completed assembled structure of FIG. 13F is assembled.

FIG. 13 shows an example of planar pattern 25i that can be cut and folded to form four tetrahedra and three of the cubic walls of a unit cell described herein. The four patterns indicate the shared faces of four tetrahedral cells. Two of these patterns 25i must be cut, folded, and bonded to form a single unit cell composed of eight tetrahedrons and six cubic cell walls. These unit cells can interlock to form a repeated interlocking cellular structure. Thin planar materials such as paper, fiber reinforced composites, etc. can be used to form very light weight assembled structures. Shipping materials and disposable energy absorbing assembled structures made of paper, fiber reinforced composites, etc. are potential applications of such unit cells. FIGS. 13A though 13D show various views of the planar pattern 25i folded into a half of a unit cell. As shown in FIG. 13E, when combined with an identical member folded planar pattern 25i, it comprises a unit cell 10i that can interlock with others to form a repeatable assembled structure 22i as shown in FIG. 13F. A method for assembling a structure composed of four such unit cells is shown in FIG. 13G.

Figure 14:
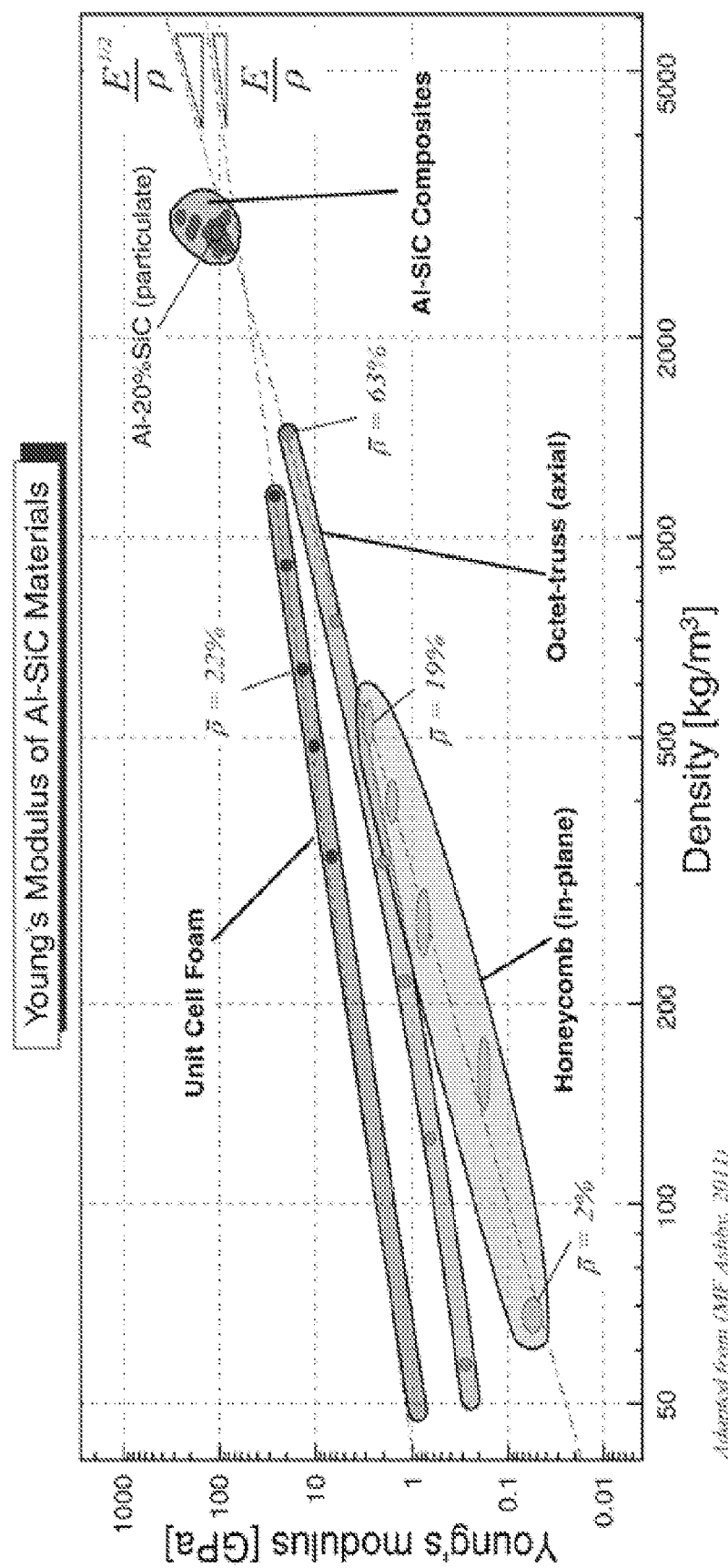
FIG. 14 is a plot of the Young's modulus of various Al—SiC materials.

FIG. 14 shows FE results for the embodiment with wall thicknesses, $t_c/t_t = \sqrt{3}$, the Octet-truss, and the measured properties of honeycombs. Nearly isotropic assembled structures comprising unit cells (referred to in the FIG. 14 as "Unit Cell Foam") composed of an Al—SiC composite outperform honeycombs by more than an order of magnitude at low densities. The stiffness of stochastic foams also scales approximately with $E^{1/2}/\rho$. The unit cells disclosed herein effectively possess theoretically maximum isotropic stiffness, nearly scaling with $E/\rho$.

Figure 16:
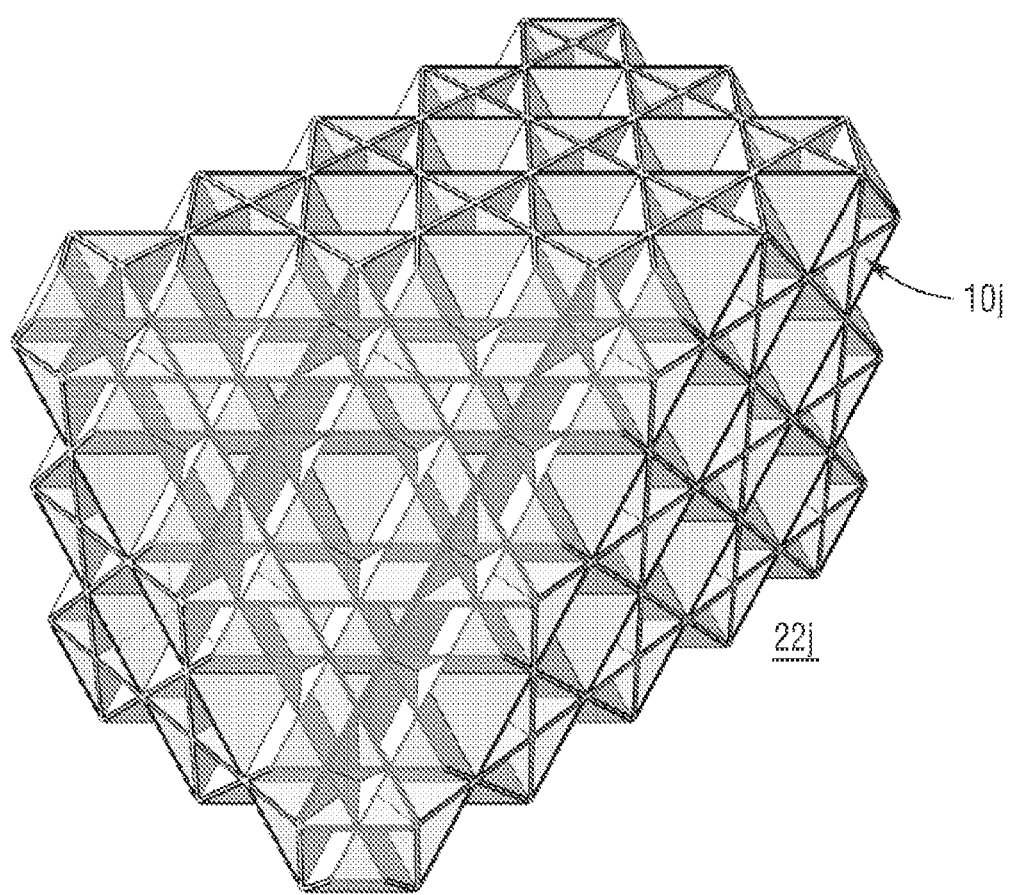
FIG. 16 is an embodiment of assembled structure sliced to reveal cross-sections.
Figure 16A:
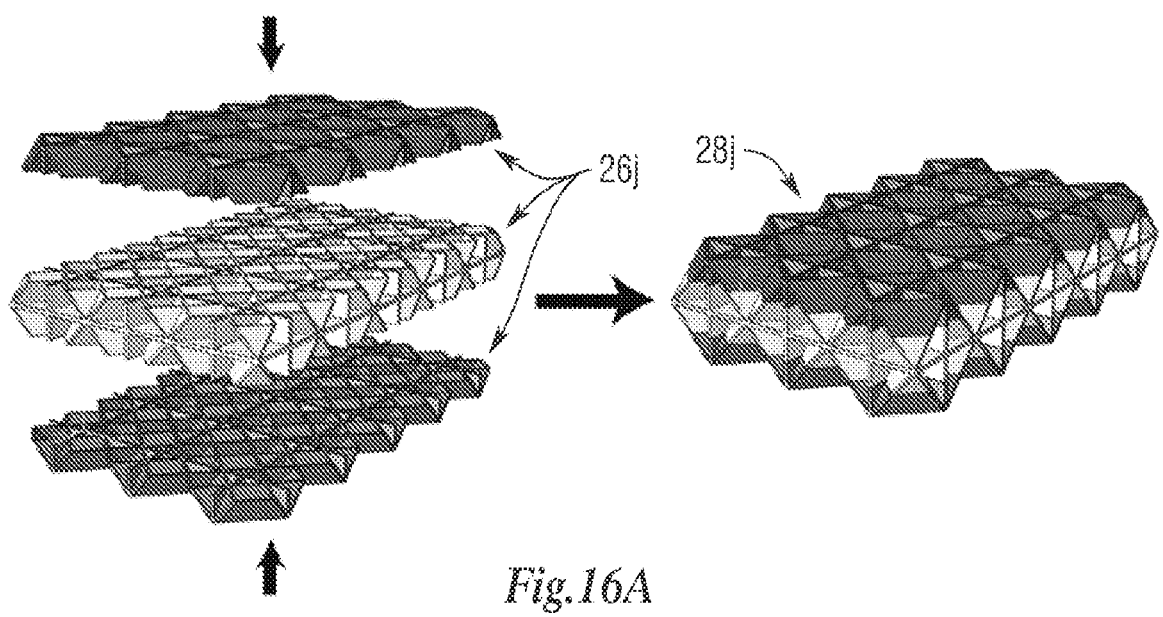
FIG. 16A shows the subcomponents of the assembled structure of FIG. 16.

Not all manufacturing methods allow for the production of closed cell geometries. In selective laser sintering (SLS) and other methods that solidify from a bath of precursor material, or investment casting, this precursor material is also enclosed in the forming process in the creation of closed cells. Therefore, in order to create an assembled structure 22j that comprises fully closed unit cells, such as that shown in FIG. 16, from such systems it is necessary for the assembled structure 22j to be created in parts that avoid the enclosing of unwanted material or to remove this material. This is illustrated in FIG. 16A in which the assembled structure 22j of FIG. 16 may be constructed as a combination of three subparts 28j which are in turn constructed from three non-closed cell layers 26j, each of which are bonded to form a fully closed cell assembled structure 22j shown in FIG. 16. What is shown are three non-closed parts that bonded to form a closed set of cells. This is just a simple illustrative example and not necessarily indicative of proper technique. Parsing of non-closed sections can be done, following the appropriate analysis, to avoid placing welds in areas of high stress or likely failure. Alternatively, in aerospace and other applications where parts see a large atmospheric pressure change, voids can be selectively placed in cell faces to allow for the transport of fluids, which also serve as a means of removing the second phase or precursor material. The interface between these sections need not be planar as depicted in FIG. 16. In fact, a non-planar interface will have more surface area to bond to and may be preferable.

Assembled structures can also be fabricated through more traditional bonding methods such as adhesives, welding, or brazing. Individual unit cells can be cut from sheets, molded, machined, or produced through additive manufacturing and then bonded to form unit cells. For example, the cubic substructure can be formed by the joining of square plates with slots as found in cardboard wine boxes. The tetrahedral cell substructures can be formed from four triangular plates joined at the edges. A complete unit cell can then be formed by the bonding of eight tetrahedral cells into the eight octants of the cubic unit cell. The unit cells illustrated herein are cubic with the same characteristic dimension. The characteristic dimension of the cubic and tetrahedral sub-geometries can differ and the relative orientations, through translations, can be altered without affecting the stiffness.

By the addition of porosity to a constituent material in the manner described herein material systems with novel stiffnesses can be produced greatly expanding the capabilities of assembled structures. Sandwich panels are a prime system of interest for application of these hybrid materials as core stiffness is a primary design variable. The high stiffness of assembled structures that comprise the unit cells disclosed herein results in a proportional weight savings where a structure that is ten times stiffer than a competing solution will see a ten times weight savings given a stiffness design requirement. In the realm of high performance structures, like those found in aerospace, rail, and naval applications, the decrease in part and vehicle mass will result in a substantial increase in efficiency both in performance and operating cost. Ships hulls, aerospace sandwich panels, and energy absorbing structures can all benefit from this type of stiff material by reducing part mass more than a factor of ten in the low relative density regime. Assembled structures comprising unit cells can replace stochastic foams and lattice structures in any application where high stiffness and strength efficiency is required making such assembled structures applicable to a myriad of solutions.

Figure 17:
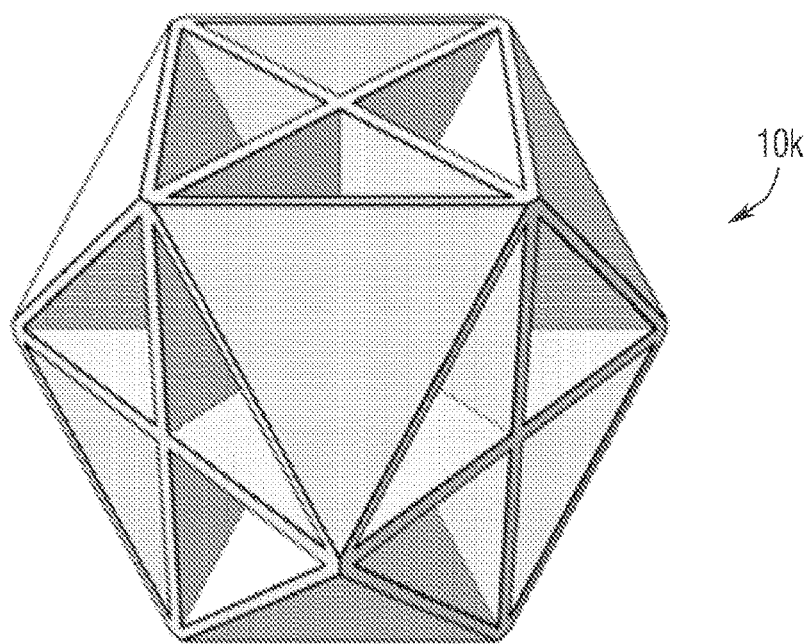
FIG. 17 is another embodiment of the unit cell.
Figure 17A:
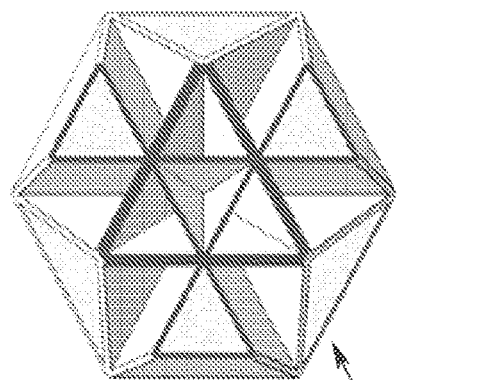
FIG. 17A is a cross section view of the unit cell of FIG. 17.
Figure 17B:
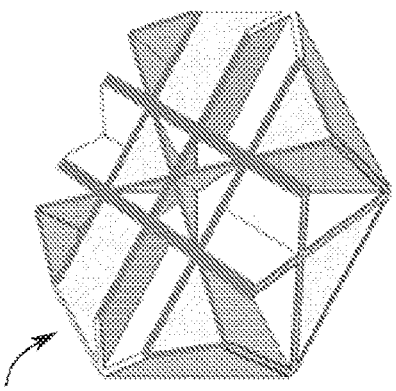
FIG. 17B is a cross section view of the unit cell of FIG. 17.
Figure 17C:
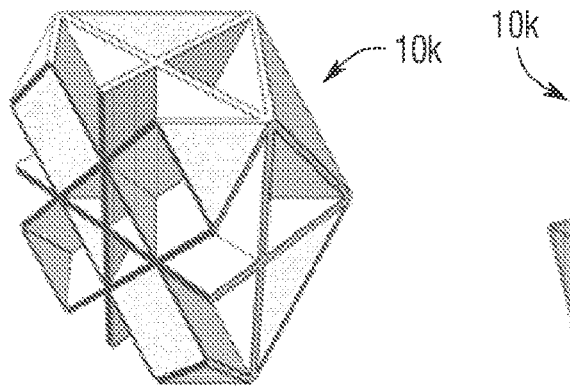
FIG. 17C is a cross section view of the unit cell of FIG. 17.
Figure 17D:
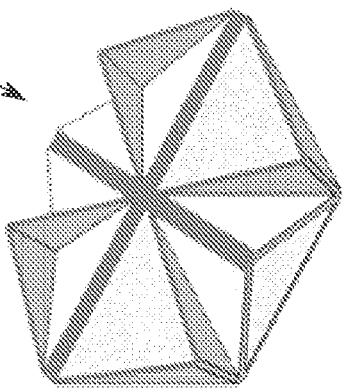
FIG. 17D is a cross section view of the unit cell of FIG. 17.

FIG. 17 shows an embodiment unit cell 10k with cross-sectional slices taken in FIGS. 17A-17D which reveal a highly aligned system and by extension assembled structures that comprise such unit cells 10k will also have highly aligned substructures.

Figure 36:
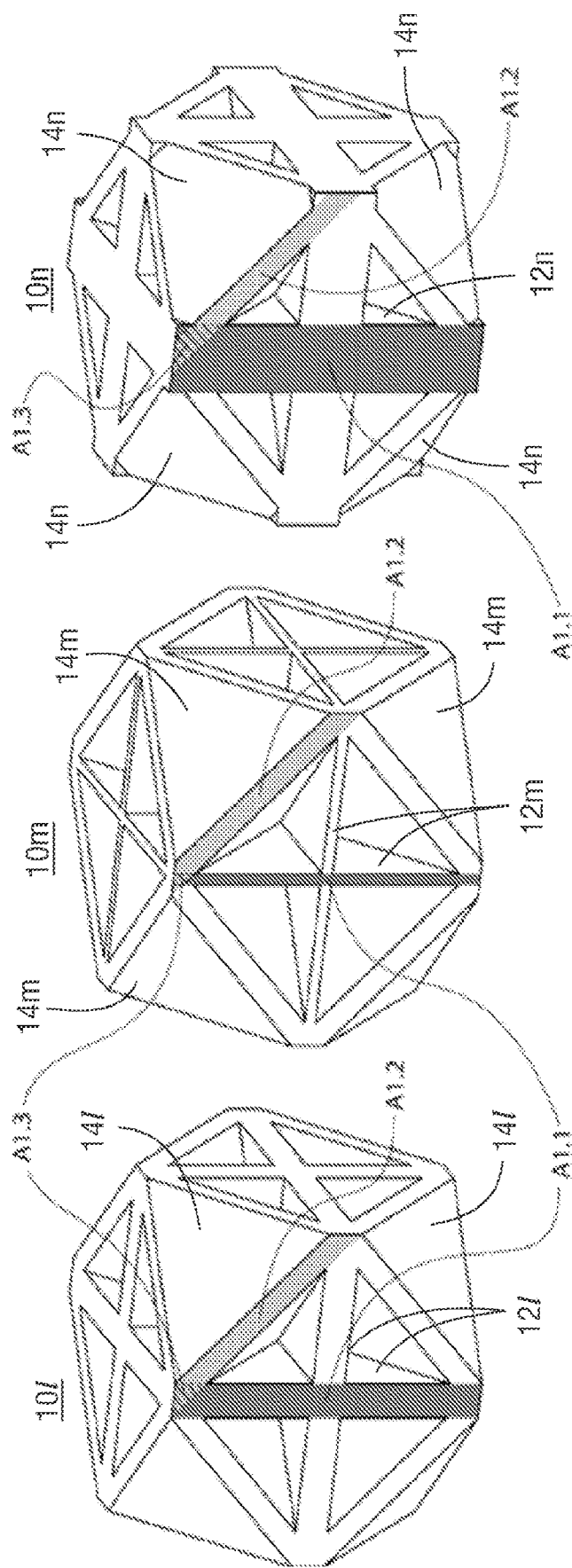
FIG. 36 depicts three embodiments of the unit cell.

FIG. 36 shows three other unit cells 10l, 10m, 10n embodiments. The simplest unit cell 10l is fully described by selecting one of three related quantities, the cubic wall thickness, $t_c$, the tetrahedral wall thickness, $t_t$, or the relative density, $\bar{\rho}/\rho_s$; choosing the relative density defines the geometry and wall thicknesses. The ratio of wall thickness in this unit cell 10l is $t_c=\sqrt{3}t_t$. This is defined geometrically and illustrated in FIG. 36. The CC 12l walls (A1.1, dark gray) overlap with the TC 14l walls (A1.2, light gray) along the cell edges. The overlap region in these end sections are shown in stripes. A triangle is formed in the overlap region (A1.3) when $t_c=\sqrt{3}t_t$ as shown in the unit cell 10l to the left in FIG. 36. In this configuration the material is nearly isotropic (the isotropy for this configuration is plotted in FIG. 23). When $t_c<\sqrt{3}t_t$, as shown in the unit cell 10m in the center in FIG. 36, the material is relatively stiff and strong in shear, making it more anisotropic. When $t_c>\sqrt{3}t_t$, as shown in the unit cell 10n to the right in FIG. 36, the material is relatively stiff (has a high Young's modulus) and strong axially. In the cases $t_c \neq \sqrt{3}t_t$ another variable must be introduced and the overlap area is not triangulated. Varying the parameters $t_c$ and $t_t$, amongst other geometric features, will be advantageous in many applications. In all three embodiments depicted in FIG. 36, the tetrahedral wall thickness is equal making the light grey areas, A1.2, including the overlap regions, A1.3, all equal.

Figure 27:
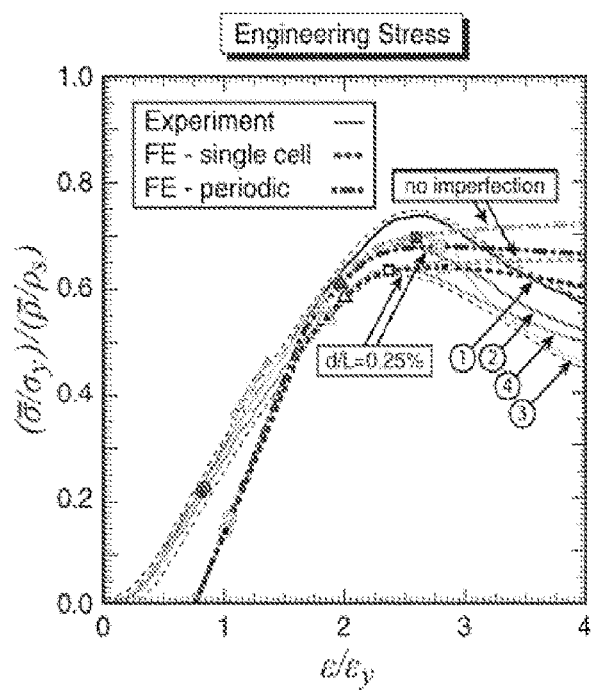
FIG. 27 is a plot of finite element analysis for engineering stress for embodiments of the unit cell under a variety of experimental conditions.
Figure 37:
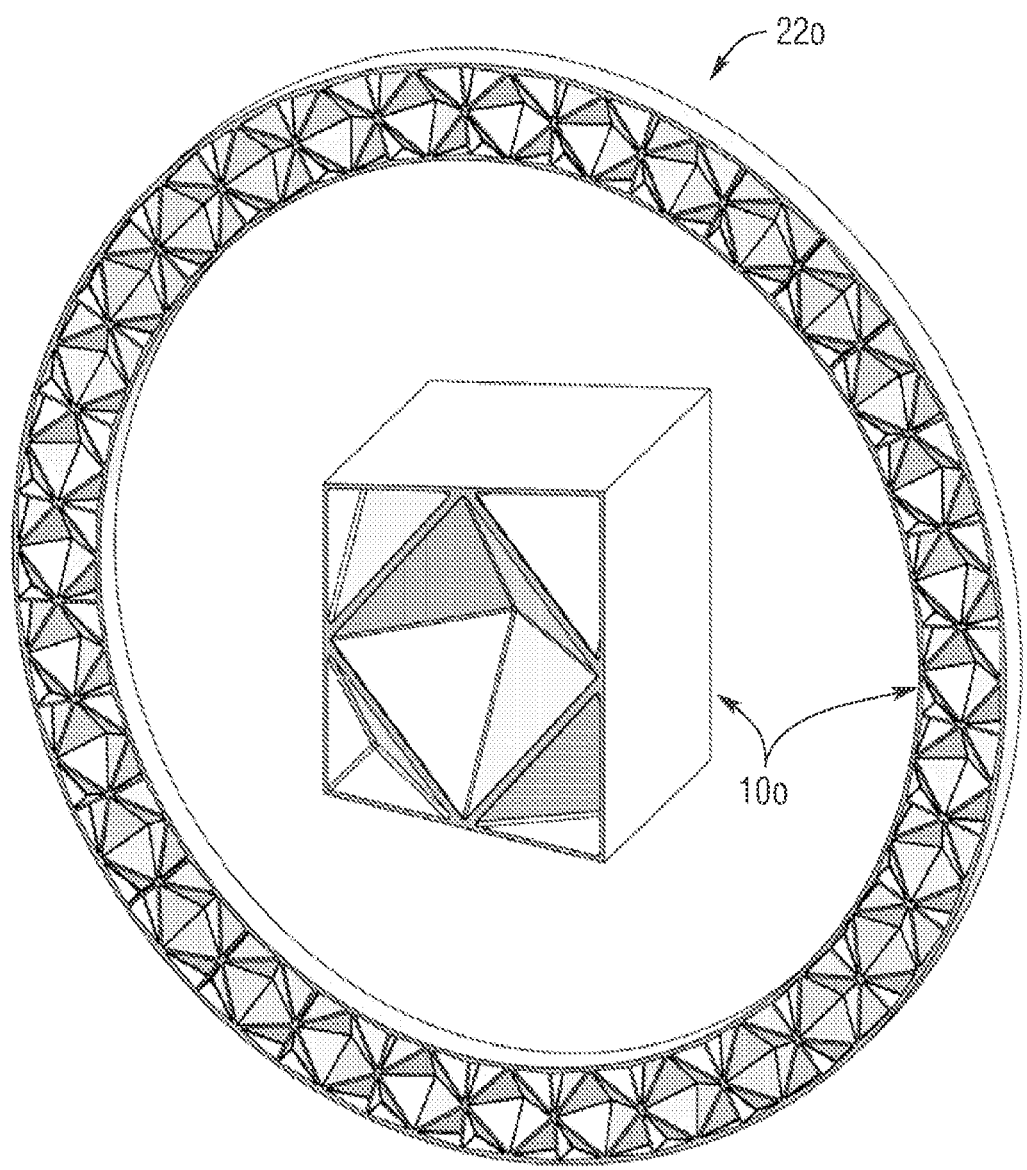
FIG. 37 depicts a skewed embodiment of the unit cell and an assembled structure in a radial configuration.
Figure 38:
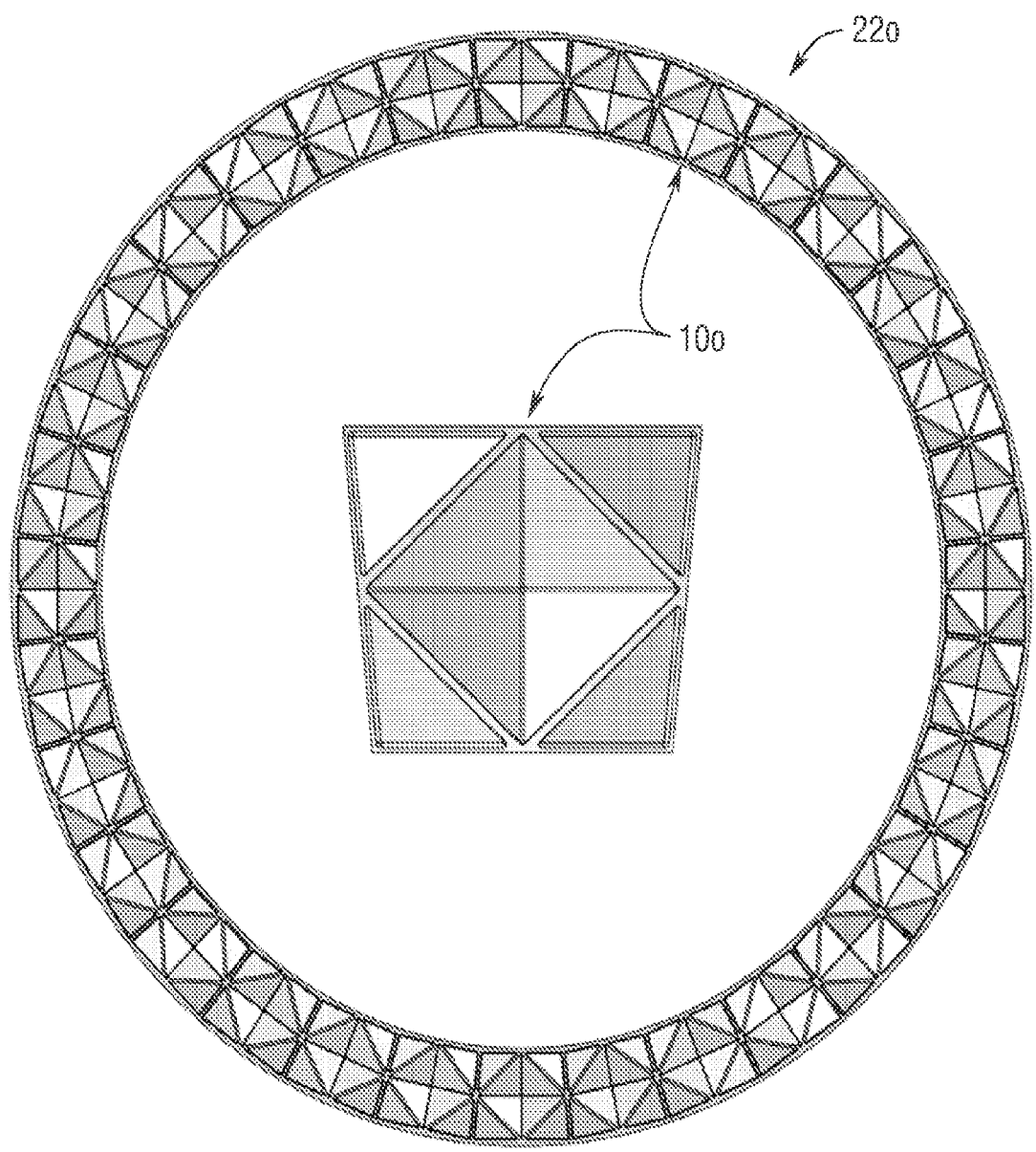
FIG. 38 is front view of the unit cell and assembled structure of FIG. 37.

FIG. 37 depicts another embodiment in which the unit cell 10o is skewed such that assembled structures 22o that comprise such unit cells 10o assemble into a radial configuration. FIG. 38 shows a front view of the unit cell 10o and the radial assembled structure 22o of FIG. 37. This illustrates the flexibility of the basic unit cell. While a completely circular tube is shown in FIGS. 27 and 38, it will be understood that other configurations of assembled structures are also possible such as non-circular tubes, arcs, troughs, channels, etc. Curved and tubular structures are common in engineering and aerospace applications, for example, as the body of a rocket.

As presented earlier, the cellular geometry that forms the unit cells disclosed herein is formed from the combination of the cubic cell (CC) and the tetrahedral cell (TC) geometries. The combination of the two geometries creates a unit cell that has voids that also have distinctive geometries. FIGS. 39 through 39C depict an embodiment of a unit cell 10p along with the void geometries represented as reciprocal cells 30p. This embodiment is described by the geometric parameters: $t_t/L=0.06$ and $t_c/t_t=\sqrt{3}$; where $t_t$ is the tetrahedral wall thickness, $t_c$ is the cubic wall thickness and L in the characteristic dimension of the cubic RVE. The reciprocal cells 30p consist of an octahedron (dark grey), irregular tetrahedrons (light grey) and regular tetrahedrons (checkered pattern). The octahedrons lie centered at the corners of the RVE. The eight faces of the octahedral cells abut eight regular tetrahedral cells. The irregular tetrahedral cells then lie between the regular tetrahedral cells.

Figure 40:
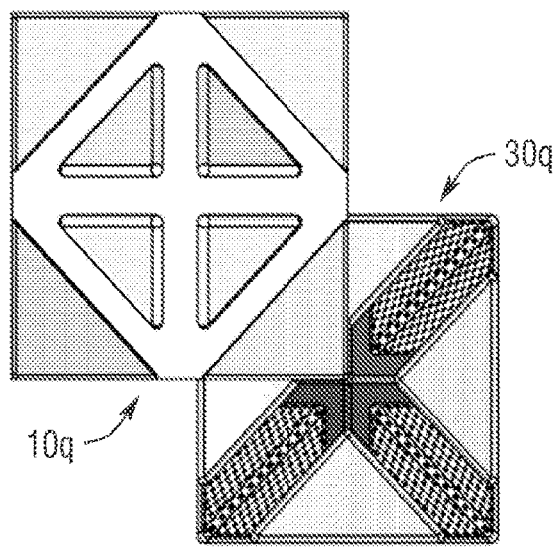
FIG. 40 is a top view of an embodiment of the unit cell along with its reciprocal cells.
Figure 40A:
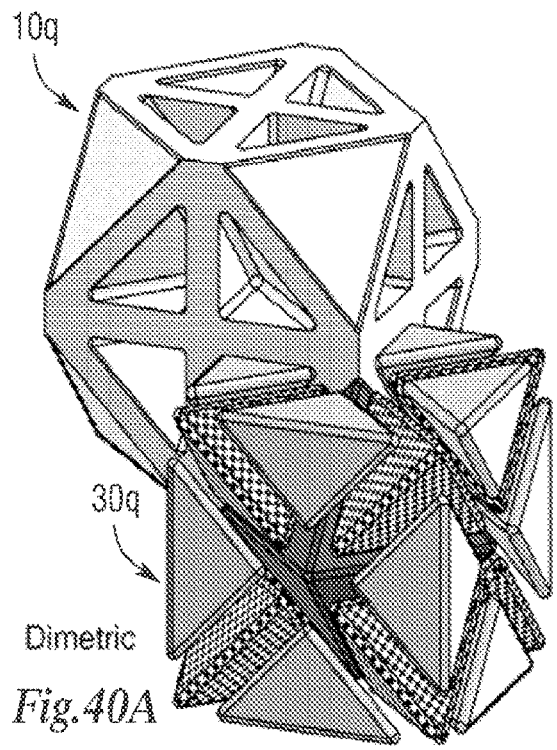
FIG. 40A is a diametric view of the unit cell of FIG. 40 along with its reciprocal cells.
Figure 40B:
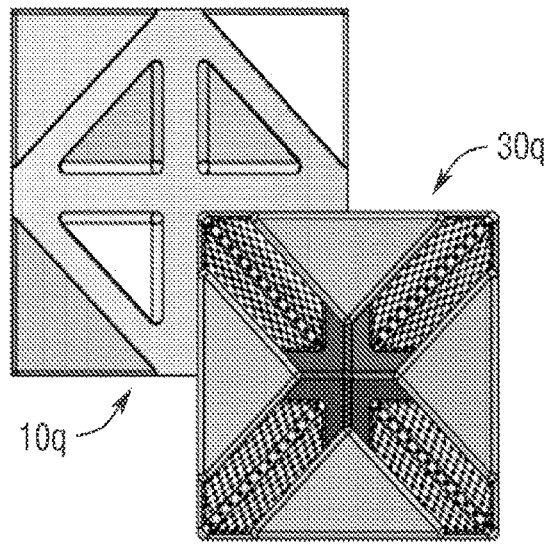
FIG. 40B is a front view of the unit cell of FIG. 40 along with its reciprocal cells.
Figure 40C:
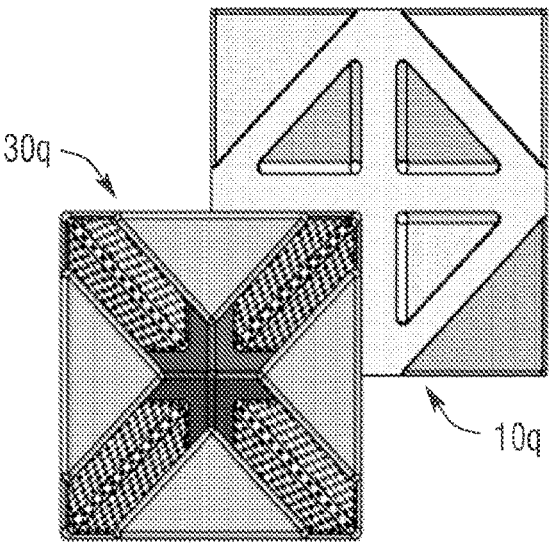
FIG. 40C is a right-side view of the unit cell of FIG. 40 along with its reciprocal cells.

FIGS. 40 through 40C depicts another embodiment of the unit cell 10q along with the void geometries represented as reciprocal cells 30q. This embodiment is described by the geometric parameters: $t_t/L=0.06$, $t_c/t_t=\sqrt{3}$ and $r/L=0.02$; where $t_t$ is the tetrahedral wall thickness, $t_c$ is the cubic wall thickness, L in the characteristic dimension of the cubic RVE and r is the fillet radius. This embodiment is the embodiment in FIGS. 39 through 39C with the addition of fillets. The reciprocal cells 30q in this embodiment consist of an octahedron (dark grey), irregular tetrahedrons (light grey) and regular tetrahedrons (checkered pattern) with filleted edges. The octahedral type cells lie centered at the corners of the RVE. The eight faces of the octahedral type cells abut eight regular tetrahedral type cells. The irregular tetrahedral type cells then lie between the regular tetrahedral type cells.

FIGS. 41 through 41C depicts another embodiment of the unit cell 10r along with the void geometries represented as reciprocal cells 30r. This embodiment is described by the geometric parameters: $t_t/L=0.06$ and $t_c/L=0.20$; where $t_t$ is the tetrahedral wall thickness, $t_c$ is the cubic wall thickness and L is the characteristic dimension of the cubic RVE. When the cubic walls have sufficient relative thickness the vertices of the octahedral voids (dark grey) and the edges of the regular tetrahedrons (checkered pattern) become truncated. The octahedral type cells lie centered at the corners of the RVE. The eight faces of the octahedral cells abut eight regular tetrahedral type cells. The irregular tetrahedral cells then lie between the regular tetrahedral type cells.

To demonstrate the fabricablity of the invention using 3-D printing, a single unit cell of the embodiment that has fillets, as shown in FIG. 8, was produced for testing. This geometry is defined by the geometric parameters: $t_t/L=0.02$, $t_c/t_t=\sqrt{3}$ and $r/L=0.02$; where $t_t$ is the tetrahedral wall thickness, $t_c$ is the cubic wall thickness, L in the characteristic dimension of the cubic RVE and r is the fillet radius. The resulting material geometry has a relative density, $(\bar{\rho}/\rho_s)=23.8\%$. Four identical unit cells of this type were produced using a Stratasys uPrint SE Plus which utilizes an ABS plastic. The characteristic dimension of the unit cells is, L=0.05 meters.

Figure 42A:
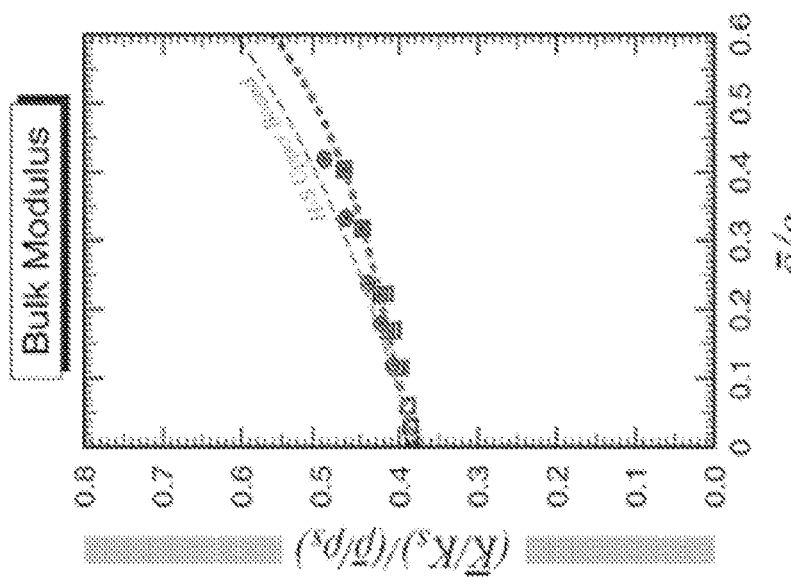
FIG. 42A depicts finite element results for the Young's modulus of various embodiments of unit cells.
Figure 42B:
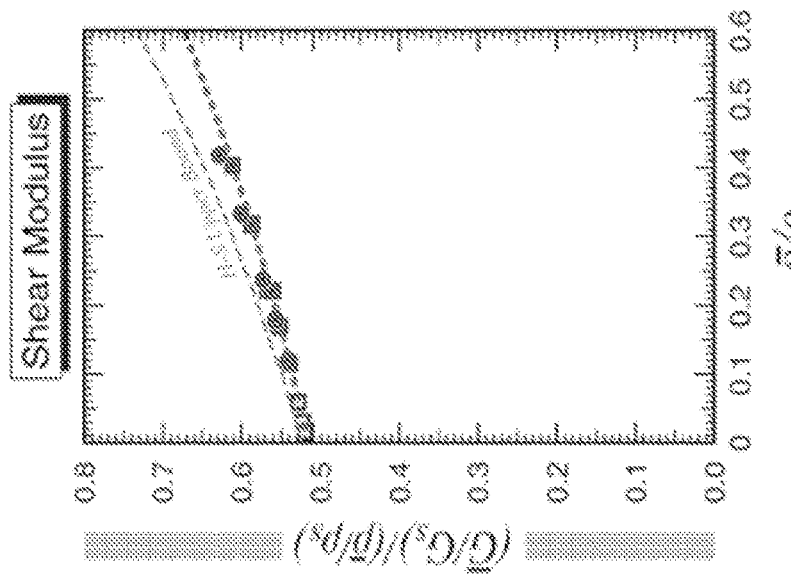
FIG. 42B depicts finite element results for the shear modulus of various embodiments of unit cells plotted versus relative density.
Figure 42C:
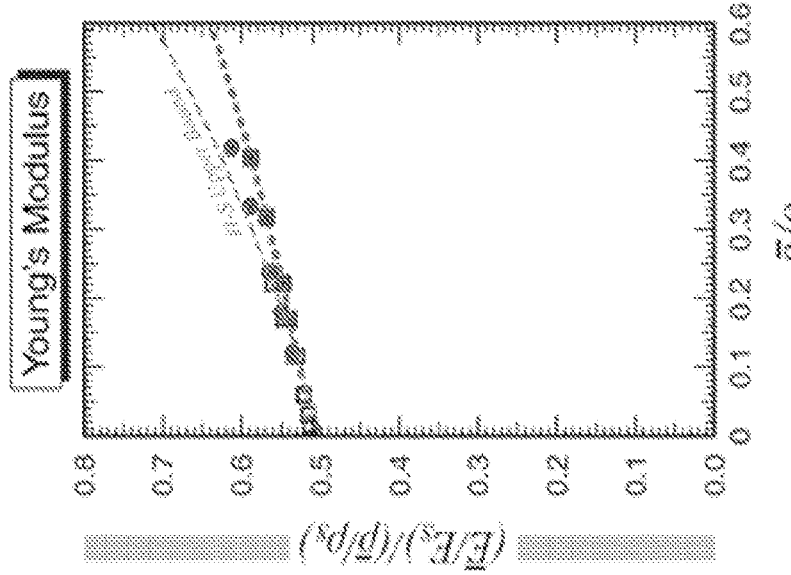
FIG. 42C depicts finite element results for the bulk modulus of various embodiments of unit cells plotted versus relative density.
Figure 43:
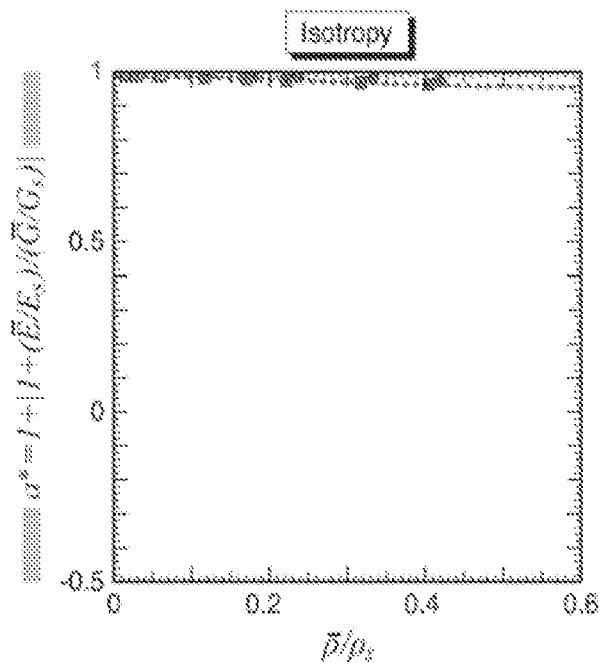
FIG. 43 is a plot of isotropy for embodiments of the unit cell without fillets.

Finite element results for the Young's, shear and bulk moduli of embodiments, those with $t_c/t_t=\sqrt{3}$ and fillet radius, $r/L=0.02$, are plotted vs. relative density in FIGS. 42A, 42B, and 42C, respectively (filled circles). The addition of fillets serves to increase the stiffness slightly over the embodiment without fillets (filled and open squares). The results without fillets are the results plotted in FIGS. 18A-18C and FIGS. 23-26. This filleted embodiment is slightly more isotropic (FIG. 43).

Figure 44:
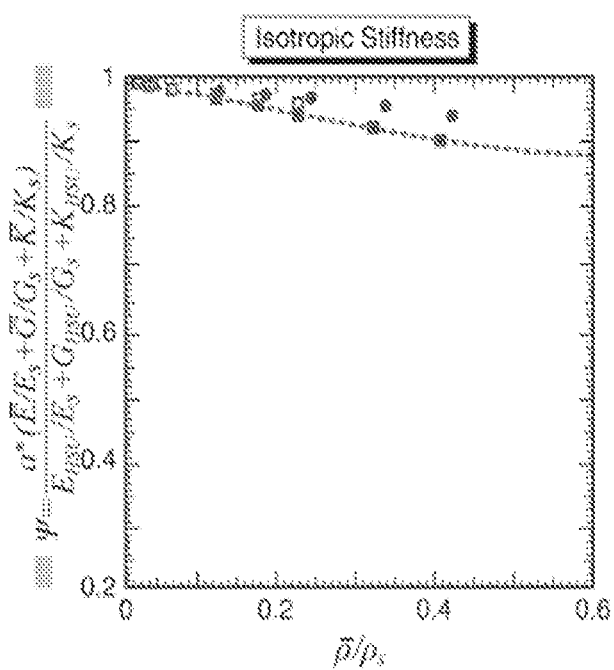
FIG. 44 is a plot of isotropic stiffness for embodiments of the unit cell without fillets.
Figure 45:
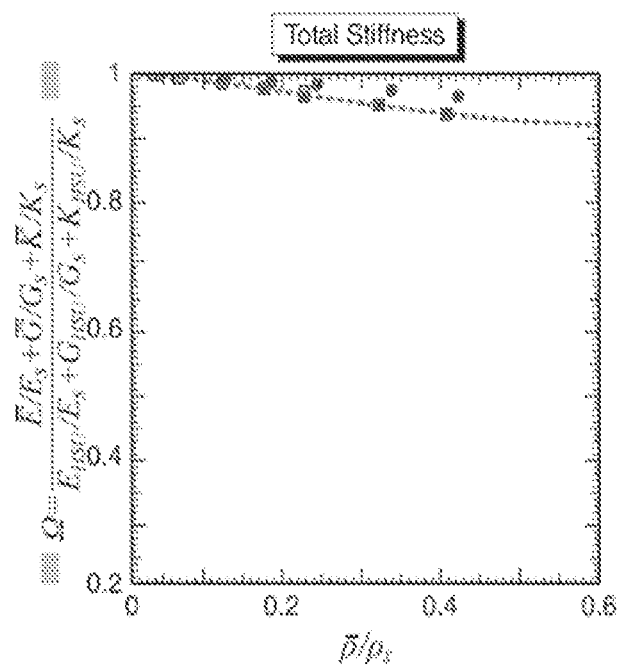
FIG. 45 is a plot of total stiffness for embodiments of the unit cell without fillets.

FIGS. 44 and 45 depict the isotropic stiffness and total stiffness, respectively, of this filleted embodiment (filled circles). The filleted embodiment has higher total and isotropic stiffness than the embodiment without fillets (filled and open squares).

Figure 46:
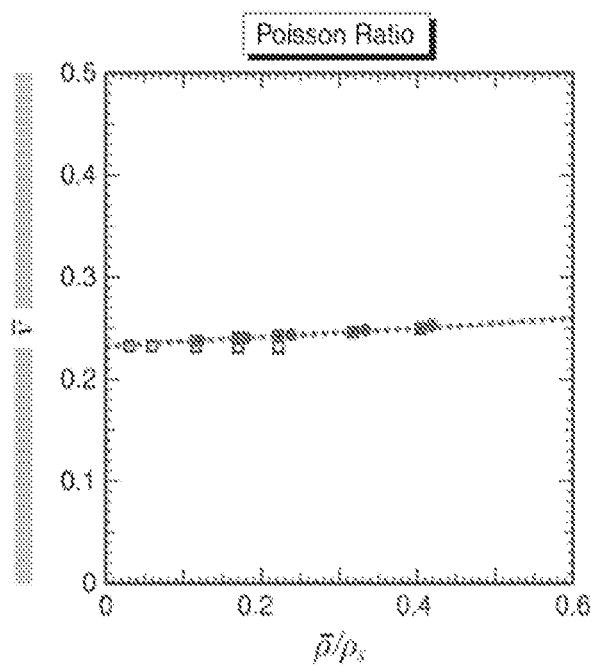
FIG. 46 is a plot of Poisson ratio for embodiments of the unit cell without fillets.

FIG. 46 depicts the Poisson ratio for the filleted embodiment (filled circles). The Poisson ratio is negligibly effected by the addition of fillets; the embodiment without fillets are plotted using filled and open squares.

Figure 28:
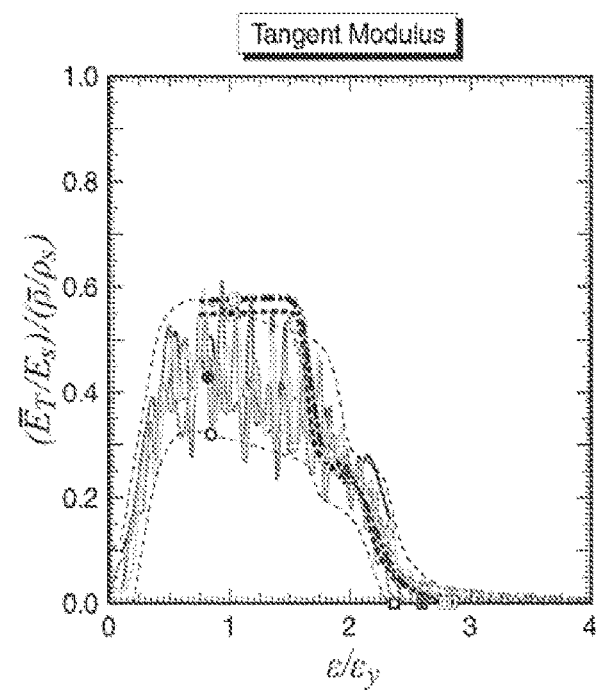
FIG. 28 is a plot of finite element analysis for tangent modulus for embodiments of the unit cell under a variety of experimental conditions.

FIGS. 27 and 28 show experimental stress vs. strain curves and tangent modulus vs. strain curves respectively, for four experiments along with finite element (FE) analysis calculations. Stresses are normalized by the yield strength of the material, $\sigma_y$, and the relative density, $\bar{\rho}/\rho_s$; strain is normalized by the yield strain in the constituent material, $\varepsilon_y$. The lowest measured peak strength (Experiment Number 4) is nearly equal to calculated strength of the imperfected single unit cell, $(\bar{\sigma}/\sigma_y)/(\bar{\rho}/\rho_s) \approx 0.63$. The highest measured peak strength (Experiment Number 1) exceeds the predicted strength of the periodic material with no imperfections, $(\bar{\sigma}/\sigma_y)/(\bar{\rho}/\rho_s) \approx 0.75$. The imperfections introduced are Eigen mode imperfections where the maximum displacement of any material point is d/L=0.25%, where d is the magnitude of the maximum displacement and L is the characteristic dimension of the cubic RVE. The stress vs. strain response is roughly bilinear prior to achieving peak strength (FIG. 27). Each linear region corresponds to a plateau in the tangent modulus (FIG. 28). FE data is offset from experimental data to align failure strains, which are $\varepsilon/\varepsilon_y \approx 2.5$ in the experiments. The measured experimental response is well predicted by FE models however the initial bedding in of the test specimens and corresponding rise in initial stiffness is not captured. The data markers correspond to images of the experiments and plots of the finite element analysis results depicted in FIG. 29 and FIGS. 30 through FIG. 35, respectively.

Figure 29:
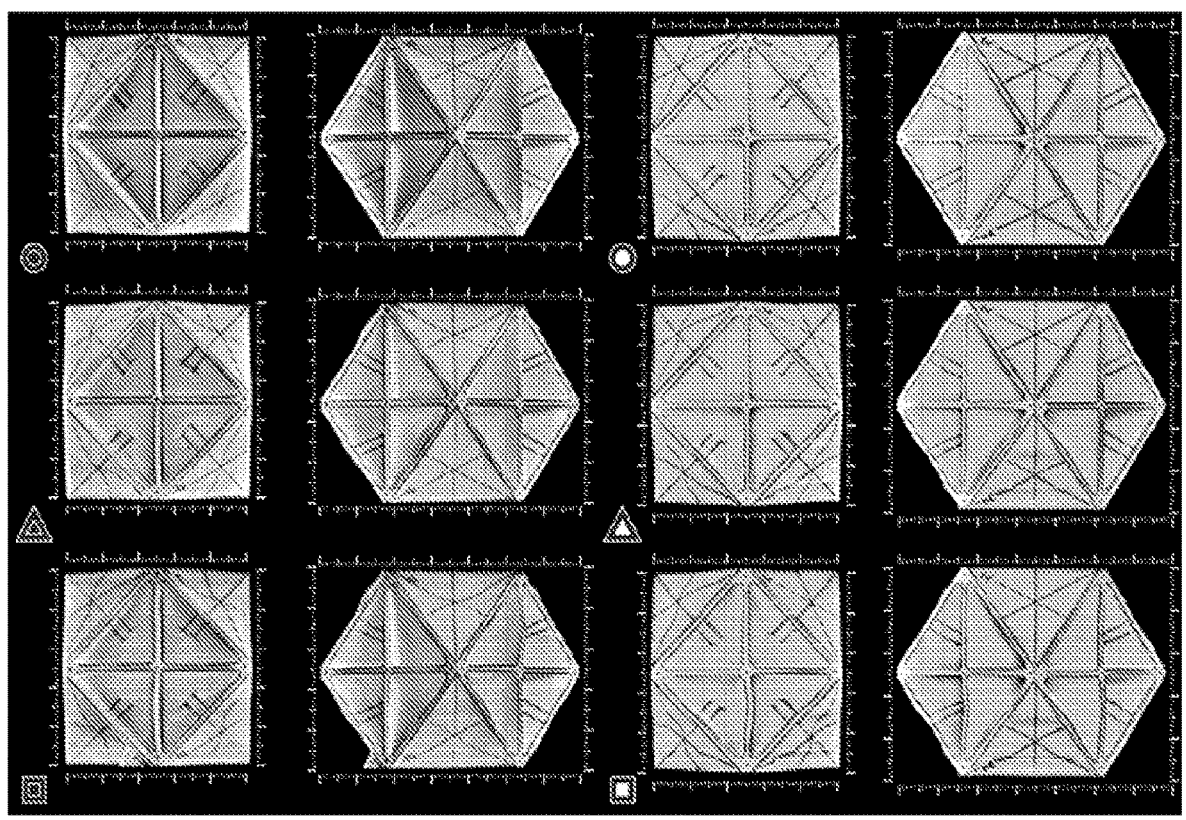
FIG. 29 depicts deformations of various compressed 3-D printed unit cells.

FIG. 29 shows experimental results of deformations in compressed off-white ABS plastic 3-D printed unit-cells. Two experiments are shown, Experiment Number 3 (the left two columns of FIG. 29) and Experiment Number 4 (the right two columns of FIG. 29). The corresponding stress vs. strain response is plotted in FIG. 27 and the tangent modulus vs. strain response is plotted in FIG. 28. Lines are drawn on the off-white ABS plastic unit cells to highlight the deformations. The symbols correspond to the symbols in FIGS. 27 and 28, which indicate the macroscopic stresses and strains in the images. Compression is along the vertical axis. The print direction is perpendicular (left) and parallel (right) to the loading direction. In the initial linear region of the stress vs. strain response straight lines largely remain straight indicating a linear elastic response. Slight buckling (warping) of the tetrahedral cells is visible (circles, top-row). Test specimens were produced using an entry level commercial 3-D printer that produces imperfections in the printed material resulting from errors in the print path. These imperfections result in surface roughness which deform prior to the onset of significant macroscopic loads. This bedding in degrades the initial stiffness of material and produces misalignment and the slight buckling of cell walls. These effects are the result of the specific 3-D printing process used in the production of these specimens and is not an inherent property of the material geometry. The second linear regime in the bilinear response is characterized by the buckling of the tetrahedral cell walls (triangles, center-row). Continued loading eventually produces buckling in the cubic walls (squares, bottom-row) followed by a drop in strength. At peak load plastic (permanent) deformations in the tetrahedral walls are associated with features in the printed layers manifest as delamination (Experiment Number 3) and creasing (Experiment Number 4). The delamination of printed layers in not captured in the FE models suggesting even higher measured strengths can be achieved.

FIGS. 30-35 variously show normalized stresses (FIGS. 30 and 33) and normalized plastic strain (FIGS. 31, 32, 34, and 35) plotted on deformed finite element analysis models containing imperfections. The periodic material is depicted in FIGS. 30 through 32 and the single unit cell structure is depicted in FIGS. 33 through 35. Stresses are normalized by the macroscopic stress and plastic strains are normalized by the yield strain of the constituent material, modeled as an ABS plastic. The material properties are modeled as linear elastic, E=1.84 GPa, nu=0.40, $\varepsilon_y$=0.1%, with 1% strain hardening used to stabilize the models. The imperfections are Eigen mode type with the maximum displacement magnitude of any material point is d/L=0.25%, where d is the magnitude of the maximum displacement and L is the characteristic dimension of the cubic RVE. Macroscopic strains are scaled to 25% to facilitate comparison between results at varying levels of macroscopic strain. The local strains depicted are then relative to the applied strain and illustrate the localization of strain in the geometry. The macroscopic strains and stresses that produce these deformations are plotted in FIG. 27 with the corresponding symbols. In the initial linear regime of the stress vs strain response (FIGS. 30 and 33) strains are relatively homogeneous. Imperfections in the geometry are evident in these greatly scaled deformations in the transverse displacement of material in cell walls. These transverse displacements are very small and the difference in Young's modulus of the perfect and imperfected geometries is negligible. The stiffness of the periodic material and single unit cell structure are nearly the same $E_{T,single\ cell}/E_{T,\ periodic} > 95\%$ in initial linear elastic regime in this embodiment. In the second linear regime of the bilinear stress vs. strain response (FIGS. 31 and 34) plasticity initiates in the cubic cell walls and elastic buckling of the tetrahedral walls occurs. Near peak load plasticity has initiated in the tetrahedral walls (FIGS. 32 and 35). A twisting mode, around the axis of the applied load, in the single unit cell structure is evident. The single cell structure is more compliant than the periodic material due to the relatively reduced constraint in the single cell structure, stemming from the lack of support from neighboring material. FE results are very consistent, both qualitatively and quantitatively, with experimental results. The peak measured strength indicates that ~75% of the material has yielded at the peak macroscopic load which are supported qualitatively by the wide distribution of plastic strain throughout the geometry (FIGS. 32 and 35).

Figure 15:
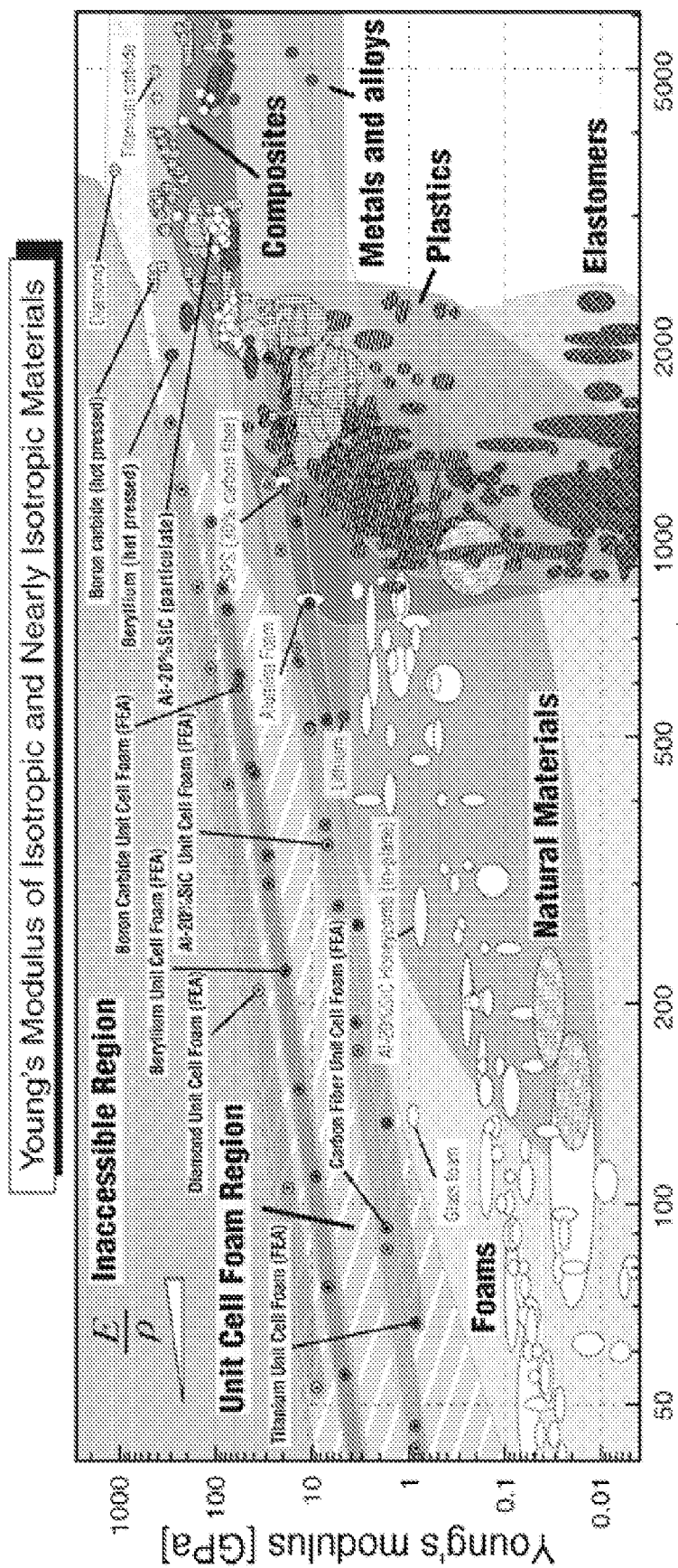
FIG. 15 is a plot of the Young's modulus of isotropic and nearly isotropic materials.

FIG. 15 depicts the FE results for this filleted embodiment extended to include various constituent materials. When compared to the universe of available nearly isotropic materials these assembled structures occupy a large and otherwise unoccupied region of property space offering high stiffness with low density. This is illustrated in FIG. 15 which relates isotropic assembled structures comprising unit cells (referred to in the FIG. 15 as "Unit Cell Foam") to other nearly isotropic materials, excluding anisotropic materials such fibers, laminates and woods. When composed of beryllium for example, the assembled structures comprising unit cells have the potential to fill a large unoccupied region of property space. Even when composed of a more common constituent material for metal foams, for example an Al—SiC particulate composite, the performance of assembled structures comprising unit cells falls in a previously unachievable region of property space. When composed of diamond the properties of some of the embodiments described herein essentially define an upper boundary of material property space.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims. One having ordinary skill in the art will see that certain steps of each claimed method can be performed out of the order in which they are claimed and that no order is required for these particular steps.

What is claimed is:

1. An assembled structure comprising:
   a plurality of unit cells, each said unit cell comprises cell walls and cell edges arranged into a cellular geometry that comprises a combination of a cubic cell geometry and a tetrahedral cell geometry arranged to have a coincident central vertex;
   for each said unit cell, said cubic cell geometry comprises three orthogonal cell faces that intersect at the coincident central vertex;
   for each said unit cell, said tetrahedral cell geometry comprises an arrangement of eight tetrahedral cells that share the coincident central vertex such that each said tetrahedral cell shares three coincident edges with three other said tetrahedral cells in a cubically symmetric arrangement; and
   for each said unit cell, said tetrahedral cell geometry is combined with said cubic cell geometry such that all vertices of said tetrahedral cell geometry are coincident with the vertices of said cubic cell geometry.

2. The assembled structure of claim 1 wherein voids created by said combination comprise regular tetrahedrons, irregular tetrahedrons, and octahedrons.

3. The assembled structure of claim 1 wherein selected said unit cells have selected cell walls having varied thickness.

4. The assembled structure of claim 1 wherein selected said unit cells have selected cell walls and selected cell edges having varied thicknesses.

5. The assembled structure of claim 1 wherein selected said unit cells have selected cell walls having one or more holes.

6. The assembled structure of claim 1 wherein selected said unit cells have selected cell edges having varying cross-sectional geometry.

7. The assembled structure of claim 1 wherein selected said unit cells have selected cell edges have varying cross-sectional geometry that varies along a length of said cell edge.

8. The assembled structure of claim 1 manufactured through a system that removes material, by welding, adhesives, brazing, or other joining methods, by using investment casting, or by a 3-D printing direct manufacturing method.

9. The assembled structure of claim 1 made from metals, metal alloys, polymers, plastics, elastomers, ceramics, natural materials, composites, fiber, particulate reinforced composites, cermets, cellular materials, including lattices and open and closed cell foams, or any combination thereof.

10. The assembled structure of claim 1 is a sandwich panel, a beam, a channel, or a tube.

11. The assembled structure of claim 1 further comprising selected said unit cells having fillets to blunt stress concentrations.

* * * * *